(12) United States Patent
Kobayashi et al.

(10) Patent No.: US 6,681,049 B1
(45) Date of Patent: Jan. 20, 2004

(54) IMAGE ENCODING METHOD AND APPARATUS

(75) Inventors: Masaaki Kobayashi, Kasuga (JP); Seiichiro Hiratsuka, Kitakyushu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/573,985

(22) Filed: May 19, 2000

(30) Foreign Application Priority Data

May 20, 1999 (JP) .......................................... 11-139737
Aug. 26, 1999 (JP) .......................................... 11-239329

(51) Int. Cl.[7] .................................................. G06K 9/36
(52) U.S. Cl. ...................................... 382/237; 358/3.06
(58) Field of Search ................................ 382/237, 232, 382/233, 234, 238, 245, 246, 244, 243, 239, 250; 341/59, 56, 65; 358/3.06, 3.2, 426.01, 426.16, 426.13, 426.02; 348/394, 409, 419

(56) References Cited

U.S. PATENT DOCUMENTS

| | | | | |
|---|---|---|---|---|
| 4,910,607 A | * | 3/1990 | Kita et al. | 358/400 |
| 5,022,088 A | * | 6/1991 | Hisada et al. | 382/235 |
| 5,057,917 A | * | 10/1991 | Shalkauser et al. | 375/240.12 |
| 5,227,893 A | * | 7/1993 | Ett | 358/400 |
| 5,680,339 A | * | 10/1997 | Moyse et al. | 708/493 |
| 6,101,282 A | * | 8/2000 | Hirabayashi et al. | 382/246 |
| 6,181,825 B1 | * | 1/2001 | Ragland et al. | 382/239 |

* cited by examiner

*Primary Examiner*—Jayanti K. Patel
*Assistant Examiner*—Seyed Azarian
(74) *Attorney, Agent, or Firm*—Stevens, Davis, Miller & Mosher, LLP.

(57) ABSTRACT

A binary image encoding method includes a predicting step of predicting a binary image, and a blocking step of blocking a data sequence, which indicates the prediction hit or miss in the predicting step, into blocks to produce blocked data. Also, a binary image encoding method includes an encoding step of switching a Huffman table in accordance with the blocked data around a Huffman-block-encoding-target block to apply the Huffman block encoding to the encoding-target block.

3 Claims, 19 Drawing Sheets

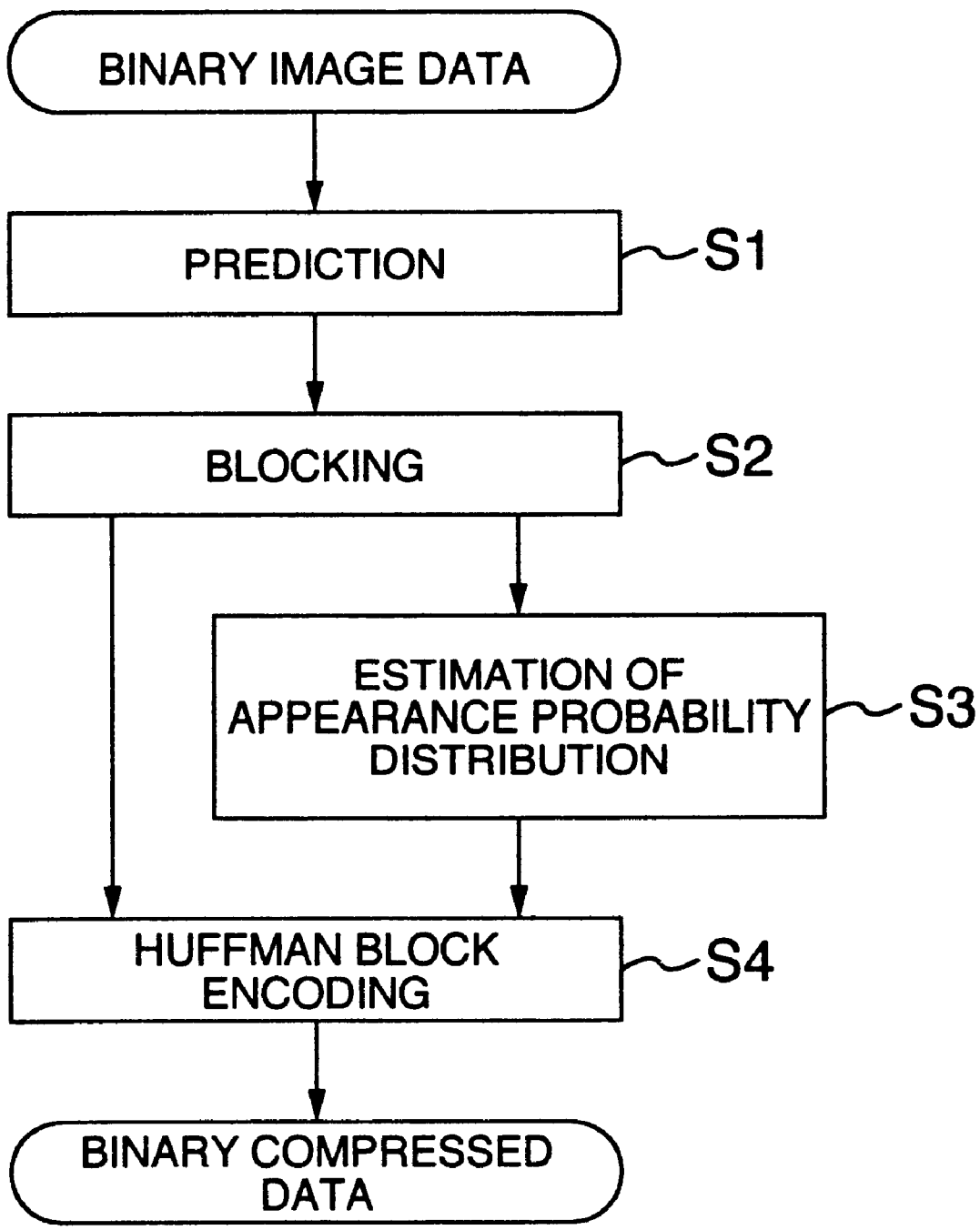

FIG. 3A

|  |  |  |
|---|---|---|
| X1 | X2 | X3 |
| X4 | X |  |

FIG. 3B

| X1 | X2 | X3 | X4 | X0 |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 0 |
| 1 | 0 | 0 | 0 | 1 |
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 0 |
| 1 | 1 | 1 | 0 | 1 |
| 1 | 1 | 1 | 1 | 1 |

□ : REFERENCE BLOCK

⌐ ¬ : ENCODING-TARGET BLOCK
└ ┘

□ : PREDICTION-HIT PIXEL

▨ : PREDICTION-MISS PIXEL

FIG. 7
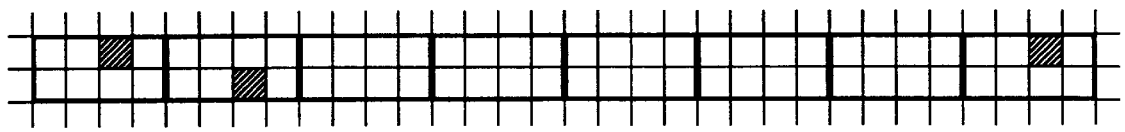
 : UNIT OF BLOCKED DATA
 : PREDICTION-HIT PIXEL
 : PREDICTION-MISS PIXEL
FIG. 8
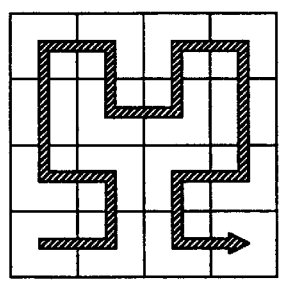
 : BLOCKED DATA
 : SCANNING ORDER

FIG. 9A
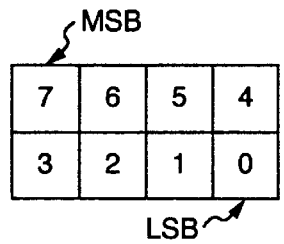
FIG. 9B
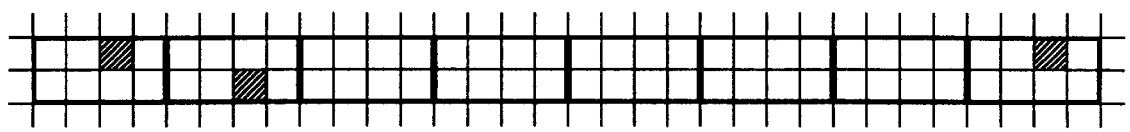
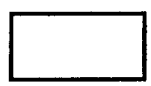 : UNIT OF BLOCKED DATA
 : PREDICTION-HIT PIXEL
 : PREDICTION-MISS PIXEL
FIG. 9C
| 0x02 | 0x02 | 0x00 | 0x00 | 0x00 | 0x00 | 0x00 | 0x02 |
FIG. 9D
| 0x02 | 0x02 | 0x00 | 0x00 | 0x03 | 0x02 |
FIG. 9E
| 0x02 | 0x02 | 0x00 | 0x00 | 0x08 | 0x02 |

FIG. 10

| RUN DATA | APPEARANCE PROBABILITY | BLOCKED DATA | APPEARANCE PROBABILITY |
|---|---|---|---|
| 0x00 | 0.033 | 0x01 | 0.049 |
| 0x01 | 0.042 | 0x02 | 0.052 |
| 0x02 | 0.034 | 0x10 | 0.051 |
| 0x03 | 0.031 | 0x80 | 0.048 |
| 0x04 | 0.029 | 0x20 | 0.047 |
| 0x05 | 0.028 | 0x40 | 0.046 |
| 0x06 | 0.022 | 0x04 | 0.045 |
| 0x07 | 0.021 | 0x08 | 0.044 |
| 0x08 | 0.018 | 0x18 | 0.044 |
| 0x09 | 0.015 | 0x28 | 0.042 |
| 0x0A | 0.014 | 0x24 | 0.041 |
| 0x0B | 0.012 | 0x41 | 0.039 |
| 0x0C | 0.011 | 0x81 | 0.039 |
| 0x0D | 0.009 | 0x48 | 0.038 |
| 0x0E | 0.007 | 0x12 | 0.036 |
| 0x0F | 0.007 | 0x42 | 0.033 |
| ⁓ | ⁓ | ⁓ | ⁓ |
| 0xF0 | 0.001 | 0xDE | 0.001 |
| 0xF1 | 0.001 | 0x7E | 0.001 |
| 0xF2 | 0.001 | 0xBE | 0.001 |
| 0xF3 | 0.001 | 0xEB | 0.001 |
| 0xF4 | 0.001 | 0xB7 | 0.001 |
| 0xF5 | 0.001 | 0xED | 0.001 |
| 0xF6 | 0.001 | 0x7F | 0.001 |
| 0xF7 | 0.001 | 0xF7 | 0.001 |
| 0xF8 | 0.001 | 0xBF | 0.001 |
| 0xF9 | 0.001 | 0xFB | 0.001 |
| 0xFA | 0.001 | 0xDF | 0.001 |
| 0xFB | 0.001 | 0xFD | 0.001 |
| 0xFC | 0.001 | 0xEF | 0.001 |
| 0xFD | 0.001 | 0xFE | 0.001 |
| 0xFE | 0.001(Min) | 0xFF | 0.001(Min) |
| 0xFF | 0.105(Max) | 0x00 | 0.063(Max) |

FIG. 12A
PRIOR ART
| X1 | X2 | X3 |
|----|----|----|
| X4 | X  |    |
FIG. 12B
PRIOR ART
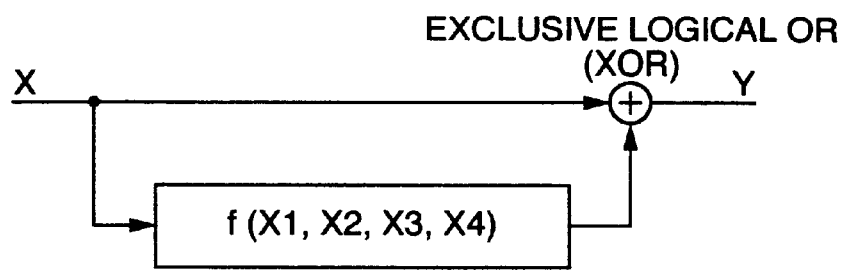
FIG. 13
PRIOR ART
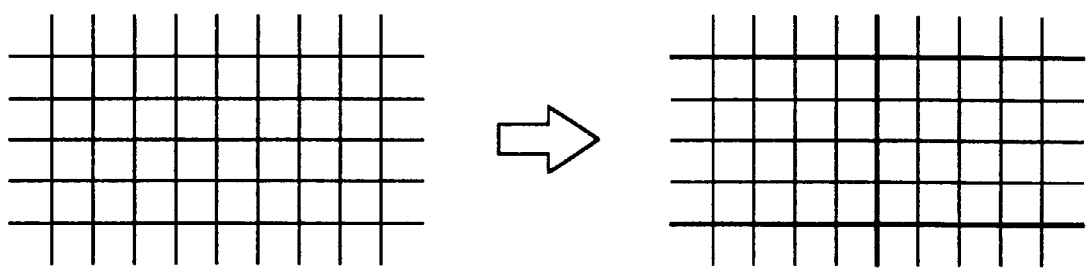

FIG. 16A
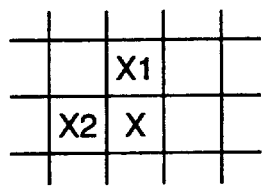
FIG. 16B
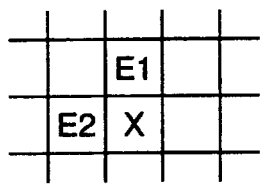
FIG. 16C
| X1 | X2 | E1 | E2 | X0 |
|----|----|----|----|----|
| 0  | 0  | 0  | 0  | 0  |
| 0  | 0  | 0  | 1  | 0  |
| 0  | 0  | 1  | 0  | 0  |
| 0  | 0  | 1  | 1  | 0  |
| 0  | 1  | 0  | 0  | 0  |
| 0  | 1  | 0  | 1  | 0  |
| 0  | 1  | 1  | 0  | 1  |
| 0  | 1  | 1  | 1  | 0  |
| 1  | 0  | 0  | 0  | 1  |
| 1  | 0  | 0  | 1  | 0  |
| 1  | 0  | 1  | 0  | 1  |
| 1  | 0  | 1  | 1  | 1  |
| 1  | 1  | 0  | 0  | 1  |
| 1  | 1  | 0  | 1  | 0  |
| 1  | 1  | 1  | 0  | 1  |
| 1  | 1  | 1  | 1  | 1  |
FIG. 17
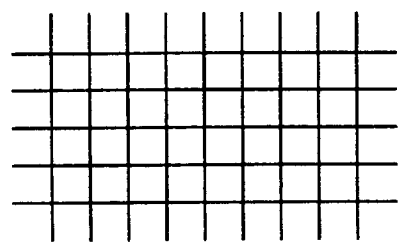 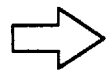 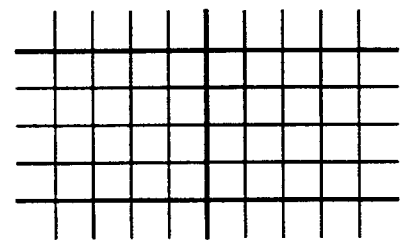

☐ : REFERENCE PIXEL

▨ : ENCODING-TARGET PIXEL

☐ : PREDICTION REFERENCE PIXEL
▨ : ENCODING-TARGET PIXEL

☐ : PREDICTION REFERENCE PIXEL
▅ ☐ : PIXELS FOR CALCULATING DOT APPEARANCE PROBABILITY
▨ : ENCODING-TARGET PIXEL

☐ : REFERENCE PIXEL

▨ : ENCODING-TARGET PIXEL

IMAGE ENCODING METHOD AND APPARATUS

BACKGROUND OF THE INVENTION

1. Field of the Invention

The present invention relates to an image encoding method and apparatus, and more particularly to a binary image encoding method for compressing data of binary images for use in data output devices such as a printer, a copier, a facsimile, and so on, a binary image encoding apparatus which implements the method, and a recording medium for executing the method.

2. Description of Related Art

In recent years, the improvements in the resolution and the image quality as well as the ability of processing colored images in the data output devices such as a printer, a copier, a facsimile and so on make the data compression technology (particularly, the compression technology directed to binary image data for preventing a degraded image quality) more and more important in order to reduce the storage capacity and the transmission time. As the compression technology suitable for the binary image data, there have been known the reversible compression techniques such as the arithmetic coding, the Huffman coding, the MH (Modified Huffman) coding, the entropy coding such as the MR (Modified READ (Relative Element Address Designate)) coding, the method which combines these coding techniques with differential coding, and so on. However, these compression techniques encounter the difficulties in realizing the sufficient compression ratio for a pseudo-gray scale binary image which is produced by converting the gradation of a multi-value image in which a natural image is mixed. To compensate for the insufficient compression ratio, conventionally, the binary image is predicted, a data sequence representative of a hit or miss for the prediction is formed into blocks for extending information source, and the blocked data is subjected to the Huffman block encoding. In the following, description will be made on a conventional technique implementing a method of encoding a pseudo-gray scale binary image produced by converting the gradation of a multi-value image in which a natural image is mixed.

FIG. 11 is a block diagram illustrating a conventional binary image encoding apparatus which employs a conventional method of encoding a pseudo-gray scale binary image.

In FIG. 11, reference numeral 1 designates a control unit, 2 a data input unit, 3 a prediction unit, 4 a prediction table, 5 a blocking unit, 6 a Huffman block encoding unit, 7 a Huffman table, and 8 a data output unit.

The following description focuses the operation and so on of the binary image encoding apparatus configured as illustrated.

Referring to FIG. 11, the control unit 1 receives from the data input unit 2 a binary image data which is an input image, and transfers the binary image data to the prediction unit 3. The prediction unit 3 performs the prediction of the received data from information on the surrounding already-encoded pixels using the prediction table 4. The prediction unit 3 converts the received data to a data sequence in which data is equal to "0" for a pixel the prediction of which is hit and data is equal to "1" for a pixel the prediction of which is miss. Subsequently, the control unit 1 transfers the data sequence indicative of the prediction hit or miss to the blocking unit 5. The blocking unit 5 converts the received data to the blocked data which consists of M×N pixels. The Huffman block encoding unit 6 utilizes the Huffman table 7 to perform the Huffman block encoding on the blocked data received from the blocking unit 5 through the control unit 1, and outputs the compressed data resulting from the encoding. The control unit 1 transfers the compressed data from the Huffman block encoding unit 6 to the data output unit 8, and outputs the compressed data from the data output unit 8.

FIGS. 12A and 12B are diagrams for explaining the prediction of the binary image. When the prediction is performed using four reference pixels X1, X2, X3 and X4 shown in FIG. 12A, there are $2^4=16$ possible states for the four pixels, and the prediction function f(X1, X2, X3, X4) is determined for each state in the following manner.

(1) f(X1, X2, X3, X4)=1 for a pattern which has the higher probability that the encoding-target pixel X is equal to "1"; and (2) f(X1, X2, X3, X4)=0 for a pattern which has the higher probability that the encoding-target pixel X is equal to "0".

As shown in FIG. 12B, the prediction function f(X1, X2, X3, X4) is used to predict a binary image to output "1" for a prediction-miss pixel and "0" for a prediction-hit pixel. The prediction function f(X1, X2, X3, X4) may take the form of a table, as shown by the prediction table 4 in FIG. 11.

FIG. 13 is a diagram for explaining the blocking procedure. As a blocking method, it is contemplated, for example as shown in FIG. 13, that a binary image is blocked into blocks of 4×4 pixels. In this event, since one block consists of 16 pixels, the blocked data is outputted as a 16-bit data sequence.

However, the foregoing conventional binary image encoding method and binary image encoding apparatus, due to the same Huffman block encoding uniformly applied on entire image data, has a problem in that the efficient encoding cannot be accomplished because it cannot sufficiently make use of the feature of image data which presents different correlation between adjacent pixels for each region.

In addition, since the reduction in the redundancy of image data due to the prediction coding is insufficient, there is a problem that it is impossible to perform the efficient encoding.

Thus, a need exists for realizing a higher compression ratio in the conventional binary image encoding method and binary image encoding apparatus, and accordingly a need exists for a recording medium which has recorded thereon this binary image encoding method for execution on a computer.

SUMMARY OF THE INVENTION

It is an object of the present invention to provide a binary image encoding method for realizing a higher compression ratio, a binary image encoding apparatus which is capable of realizing a higher compression ratio, and a recording medium having recorded thereon this binary image encoding method for execution on a computer.

In order to solve the problems mentioned above, a binary image encoding method according to the present invention comprises: a predicting step of predicting a binary image; a blocking step of blocking a data sequence into blocks to produce blocked data, the data sequence indicating whether a prediction at the predicting step is hit or miss; and an encoding step of switching a Huffman table in accordance with the blocked data around a Huffman-block-encoding-target block to apply a Huffman block encoding to the Huffman-block-encoding-target block.

Thereby, it is possible to provide a binary image encoding method for realizing the higher compression ratio.

In order to solve the problems mentioned above, a binary image encoding apparatus according to the present invention comprises: a prediction unit for predicting a binary image; a blocking unit for blocking a data sequence into blocks to produce blocked data, the data sequence indicating whether the predictions in the prediction unit are hit or miss; a Huffman block encoding unit for switching a Huffman table in accordance with the blocked data around a Huffman-block-encoding-target block to apply the Huffman block encoding to the target block; and a control unit for controlling the binary image encoding apparatus.

Thereby, it is possible to provide the binary image encoding apparatus for realizing the higher compression ratio.

In order to solve the problems mentioned above, a recording medium according to the present invention has a program recorded thereon, the program causing a computer to execute the steps of: predicting a binary image; blocking a data sequence into blocks to produce blocked data, the data sequence indicating whether a prediction at the predicting step is hit or miss; and switching a Huffman table in accordance with the blocked data around a Huffman-block-encoding-target block to apply a Huffman block encoding to the Huffman-block-encoding-target block.

Thereby, it is possible to provide the recording media for causing a computer to execute the binary image encoding method mentioned above.

In order to solve the problems mentioned above, a binary image encoding apparatus according to the present invention comprises: input means for receiving binary image data; prediction means for predicting a binary image of an encoding-target pixel with reference to a prediction table based on surrounding binary image data around the encoding-target pixel and prediction error data of an already-encoded pixel to produce a data sequence which indicates a prediction hit or miss; a blocking means for blocking the data sequence, which is produced by the prediction means, into blocks; entropy-encoding means for entropy-encoding the blocked data sequence using a table; and output means for outputting entropy-encoded binary compressed data.

Thereby, it is possible to perform the binary image encoding at the higher compression ratio.

The first binary image encoding method according to the present invention comprises: a predicting step of predicting a binary image; a blocking step of blocking a data sequence into blocks to produce blocked data, the data sequence indicating whether a prediction at the predicting step is hit or miss; and an encoding step of switching a Huffman table in accordance with the blocked data around a Huffman-block-encoding-target block to apply a Huffman block encoding to the Huffman-block-encoding-target block.

Due to this construction, it is possible to perform the Huffman block encoding using the optimal Huffman table from the surrounding blocked data. Thereby, the binary image encoding can be advantageously accomplished at the higher compression ratio.

The second binary image encoding method according to the present invention is the first binary image encoding method according to the present invention and further comprises a model determining step of determining an appearance probability distribution model for a value of blocked data of the Huffman-block-encoding-target block with reference to the blocked data, wherein the encoding step includes a step of switching the Huffman table to another Huffman table which is designed optimally to the appearance probability distribution model.

Due to this construction, it is possible to estimate the appearance probability distribution of the value of the blocked data of the Huffman-block-encoding-target block from the surrounding blocked data to perform the Huffman block encoding using the Huffman table designed optimally to the estimated appearance probability distribution. Thereby, the binary image encoding can be advantageously accomplished at the higher compression ratio.

The third binary image encoding method according to the present invention comprises: a predicting step of predicting a binary image; a blocking step of blocking a data sequence into blocks to produce blocked data, the data sequence indicating whether a prediction at the predicting step is hit or miss; a converting step of converting the blocked data to run data when the number of consecutive blocks exceeds a threshold value, all of the predictions of the blocked data for pixels within each of the consecutive blocks being hit, and the run data indicating the number of the consecutive blocks in each of which all of the predictions are hit; and an encoding step of encoding the run data in accordance with a Huffman block encoding scheme when the blocked data is converted to the run data at the converting step, and encoding the blocked data in accordance with the Huffman block encoding scheme when the blocked data is not converted to the run data.

Due to this construction, it is possible to collectively perform the Huffman block encoding on the plurality of blocks as the run data when the plurality of blocks, in each of which all of the predictions are hit, appear in succession. Thereby, the -binary image encoding can be advantageously accomplished at the higher compression ratio.

The fourth binary image encoding method according to the present invention is the third binary image encoding method according to the present invention wherein the converting step includes a step of reducing a maximum run length to a length or less which can be represented by the number of bits equal to the number of pixels constituting one block of the blocked data.

Due to this construction, it is possible to encode the run data using the same Huffman table as that used for the Huffman block encoding performed on the blocked data. Thereby, the binary image encoding can be advantageously accomplished with the extremely simple hardware configuration.

The first binary image encoding apparatus according to the present invention comprises: a prediction unit for predicting a binary image; a blocking unit for blocking a data sequence into blocks to produce blocked data, the data sequence indicating whether the predictions in the prediction unit are hit or miss; a Huffman block encoding unit for switching a Huffman table in accordance with the blocked data around a Huffman-block-encoding-target block to apply the Huffman block encoding to the target block; and a control unit for controlling the binary image encoding apparatus.

Due to this construction, it is possible to perform the Huffman block encoding using the optimal Huffman table selected based on the surrounding blocked data. Thereby, the binary image encoding can be advantageously accomplished at the higher compression ratio.

The second binary image encoding apparatus according to the present invention comprises: a prediction unit for predicting a binary image; a blocking unit for blocking a data sequence into blocks to produce blocked data, the data sequence indicating whether the predictions in the prediction unit are hit or miss; a run data creation unit for converting the blocked data to run data when the number of consecutive blocks exceeds a threshold value, all of the predictions of the blocked data for pixels within each of the consecutive blocks being hit, and the run data indicating the number of the consecutive blocks in each of which all of the predictions are hit; a Huffman block encoding unit for encoding the run data in accordance with a Huffman block encoding scheme when the blocked data is converted to the run data by the run data creation unit, and encoding the blocked data in accordance with the Huffman block encoding scheme when the blocked data is not converted to the run data by the run data creation unit; and a control unit for controlling the binary image encoding apparatus.

Due to this construction, it is possible to collectively perform the Huffman block encoding on the plurality of blocks as the run data when the plurality of blocks, in each of which all of the predictions are hit, appear in succession. Thereby, the binary image encoding can be advantageously accomplished at the higher compression ratio.

The first recording medium according to the present invention has a program recorded thereon, the program causing a computer to execute the steps of: predicting a binary image; blocking a data sequence into blocks to produce blocked data, the data sequence indicating whether a prediction at the predicting step is hit or miss; and switching a Huffman table in accordance with the blocked data around a Huffman-block-encoding-target block to apply a Huffman block encoding to the Huffman-block-encoding-target block.

Due to this construction, it is possible to execute the first binary image encoding method according to the present invention at an arbitrary location at an arbitrary time.

The second recording medium according to the present invention has a program recorded thereon, the program causing a computer to execute the steps of: predicting a binary image; blocking a data sequence into blocks to produce blocked data, the data sequence indicating whether a prediction at the predicting step is hit or miss; determining an appearance probability distribution model for value of blocked data of an encoding-target block with reference to the blocked data; and switching to a Huffman able which is designed optimally to the appearance probability distribution model, to apply the Huffman block encoding to the encoding-target block.

Due to this construction, it is possible to execute the second binary image encoding method according to the present invention at an arbitrary location at an arbitrary time.

The third recording medium according to the present invention has a program recorded thereon, the program causing a computer to execute the steps of: predicting a binary image; blocking a data sequence into blocks to produce blocked data, the data sequence indicating whether a prediction at the predicting step is hit or miss; converting the blocked data to run data when the number of consecutive blocks exceeds a threshold value, all of the predictions of the blocked data for pixels within each of the consecutive blocks being hit, and the run data indicating the number of the consecutive blocks in each of which all of the predictions are hit; and encoding the run data in accordance with a Huffman block encoding scheme when the blocked data is converted to the run data at the converting step, and encoding the blocked data in accordance with the Huffman block encoding scheme when the blocked data is not converted to the run data.

Due to this construction, it is possible to execute the third binary image encoding method according to the present invention at an arbitrary location at an arbitrary time.

The third binary image encoding apparatus according to the present invention comprises: input means for receiving binary image data; prediction means for predicting a binary image of an encoding-target pixel with reference to a prediction table based on surrounding binary image data around the encoding-target pixel and prediction error data of an already-encoded pixel to produce a data sequence which indicates a prediction hit or miss; a blocking means for blocking the data sequence, which is produced by the prediction means, into blocks; entropy-encoding means for entropy-encoding the blocked data sequence using a table; and output means for outputting entropy-encoded binary compressed data.

Thereby, the prediction of the binary image of the encoding-target pixel is performed using the surrounding binary image data and the prediction error data of the already-encoded pixels, so that it is possible to accomplish the binary image encoding at the higher compression ratio.

The fourth binary image encoding apparatus according to the present invention comprises: input means for receiving binary image data; selection means for selecting surrounding binary image data for use in a prediction from a data sequence which indicates a prediction hit or miss in an already-encoded pixel around an encoding-target pixel; prediction means for predicting a binary image of the encoding-target pixel with reference to the selection means and a prediction table to produce a data sequence which indicates a prediction hit or miss; blocking means for blocking the data sequence, which is produced by the prediction means, into blocks; entropy-encoding means for entropy-encoding the blocked data sequence using a table; and output means for outputting entropy-encoded binary compressed data.

Thereby, the prediction of the binary image is performed with the smaller number of the reference pixels by selecting the surrounding pixel for use in the prediction from the prediction error data of the already-encoded pixel, so that it is possible to accomplish the high speed binary image encoding at the higher compression ratio.

The fifth binary image encoding apparatus according to the present invention comprises: input means for receiving binary image data; switching means for switching between a prediction performed with reference to a prediction table and a prediction performed using logical operation means; prediction means for predicting a binary image of an encoding-target pixel with the logical operation means when the prediction is possible through a logical operation, and otherwise with the prediction table, to produce a data sequence which indicates a prediction hit or miss; blocking means for blocking the data sequence, which is produced by the prediction means, into blocks; entropy-encoding means for entropy-encoding the blocked data sequence using a table; and outputting means for outputting entropy-encoded binary compressed data.

Thereby, the prediction is performed through the logical operation by deleting from the prediction table such patterns that need not be described therein for determining the predicted values due to the partiality of the surrounding pixel information, so that it is possible to reduce the size of the prediction table to accomplish the high speed binary image encoding at the higher compression ratio.

The fifth binary image encoding method according to the present invention comprises the steps of: predicting a binary image of an encoding-target pixel with reference to a prediction table based on surrounding binary image data around the encoding-target pixel and prediction error data of an already-encoded pixel to produce a data sequence which indicates a prediction hit or miss; blocking the produced data sequence into blocks; entropy-encoding the blocked data sequence using a table; and outputting entropy-encoded binary compressed data.

Thereby, the prediction of the binary image of the encoding-target pixel is performed using the surrounding binary image data and the prediction error data of the already-encoded pixel, so that the binary image encoding can be accomplished at the higher compression ratio.

The sixth binary image encoding method comprising the steps of: selecting surrounding binary image data for use in a prediction from a data sequence which indicates a prediction hit or miss in an already-encoded pixel around an encoding-target pixel; predicting a binary image of the encoding-target pixel with reference to the selected surrounding binary image data and a prediction table to produce a data sequence which indicates a prediction hit or miss; blocking the produced data sequence into blocks; entropy-encoding the blocked data sequence using a table; and outputting entropy-encoded binary compressed data.

Thereby, the prediction of the binary image using the smaller number of the reference pixels by selecting the surrounding pixel for use in the prediction from the prediction error data of the already-encoded pixel, so that it is possible to accomplish the high speed binary image encoding at the higher compression ratio.

The seventh binary image encoding method according to the present invention comprises the steps of: predicting a binary image of an encoding-target pixel through a logical operation when a prediction is possible through the logical operation, and otherwise with a prediction table, to produce a data sequence which indicates a prediction hit or miss; blocking the produced data sequence into blocks; entropy-encoding the blocked data sequence using a table; and outputting entropy-encoded binary compressed data.

Thereby, the prediction is performed through the logical operation by deleting from the prediction table such patterns that need not be described therein for determining the predicted values due to the partiality of the surrounding pixel information, so that it is possible to reduce the size of the prediction table to accomplish the high speed binary image encoding at the higher compression ratio.

The first information recording medium according to the present invention has a program stored thereon, the program causing a computer to execute the steps of: predicting a binary image of an encoding-target pixel with reference to a prediction table based on surrounding binary image data around the encoding-target pixel and prediction error data of an already-encoded pixel to produce a data sequence which indicates a prediction hit or miss; blocking the produced data sequence into blocks; entropy-encoding the blocked data sequence using a table; and outputting entropy-encoded binary compressed data.

Thereby, the prediction of the binary image of the encoding-target pixel is performed using the surrounding binary image data and the prediction error data of the already-encoded pixel, so that the binary image encoding can be accomplished at the higher compression ratio.

The third information recording medium according to the present invention has a program stored thereon, the program causing a computer to execute the steps of: selecting surrounding binary image data for use in a prediction from a data sequence which indicates a prediction hit or miss in an already-encoded pixel around an encoding-target pixel; predicting a binary image of the encoding-target pixel with reference to the selected surrounding binary image data and a prediction table to produce a data sequence which indicates a prediction hit or miss; blocking the produced data sequence into blocks; entropy-encoding the blocked data sequence using a table; and outputting entropy-encoded binary compressed data.

Thereby, the prediction of the binary image is performed with the smaller number of the reference pixels by selecting the surrounding pixel for use in the prediction from the prediction error data of the already-encoded pixel, so that it is possible to accomplish the high speed binary image encoding at the higher compression ratio.

The third information recording medium having a program stored thereon, the program causing a computer to execute the steps of: predicting a binary image of an encoding-target pixel through a logical operation when a prediction is possible through the logical operation, and otherwise with a prediction table, to produce a data sequence which indicates a prediction hit or miss; blocking the produced data sequence into blocks; entropy-encoding the blocked data sequence using a table; and outputting entropy-encoded binary compressed data.

Thereby, the prediction is performed through the logical operation by deleting from the prediction table such patterns that need not be described therein for determining the predicted values due to the partiality of the surrounding pixel information, so that it is possible to reduce the size of the prediction table to accomplish the high speed binary image encoding at the higher compression ratio.

BRIEF DESCRIPTION OF THE DRAWINGS

FIG. 2 is a flow chart illustrating the operation of the binary image encoding apparatus of FIG. 1;

FIG. 3A is a diagram showing reference pixels;

FIG. 3B is a diagram showing an example of a prediction table when four surrounding pixels are used as the reference pixels;

FIG. 7 is a diagram for explaining how to count the number of consecutive blocked data;

FIG. 8 is a diagram for explaining the scanning order for counting the number of the consecutive blocked data;

FIGS. 9A–9E are diagrams for explaining the blocked data and the run data when a threshold value is equal to "2";

FIG. 10 is a diagram showing an example of a correspondence table showing the respective run lengths and which of Huffman codes is used when the maximum run length is equal to "255";

FIGS. 12A and 12B are diagrams for explaining the prediction of the binary image;

FIG. 13 is a diagram for explaining the blocking procedure;

FIG. 16A is a diagram for explaining the reference pixels in the prediction of the binary image;

FIG. 16B is a diagram for explaining the reference prediction error data in the prediction of the binary image;

FIG. 16C is a diagram for explaining an example of a prediction table;

FIG. 17 is a diagram for explaining how a data sequence is blocked through the prediction of the binary image;

DETAILED DESCRIPTION OF THE EMBODIMENTS

Several embodiments of the present invention will hereinafter be described with reference to FIGS. 1–10 and 14–26.

First Embodiment

Figure 1:
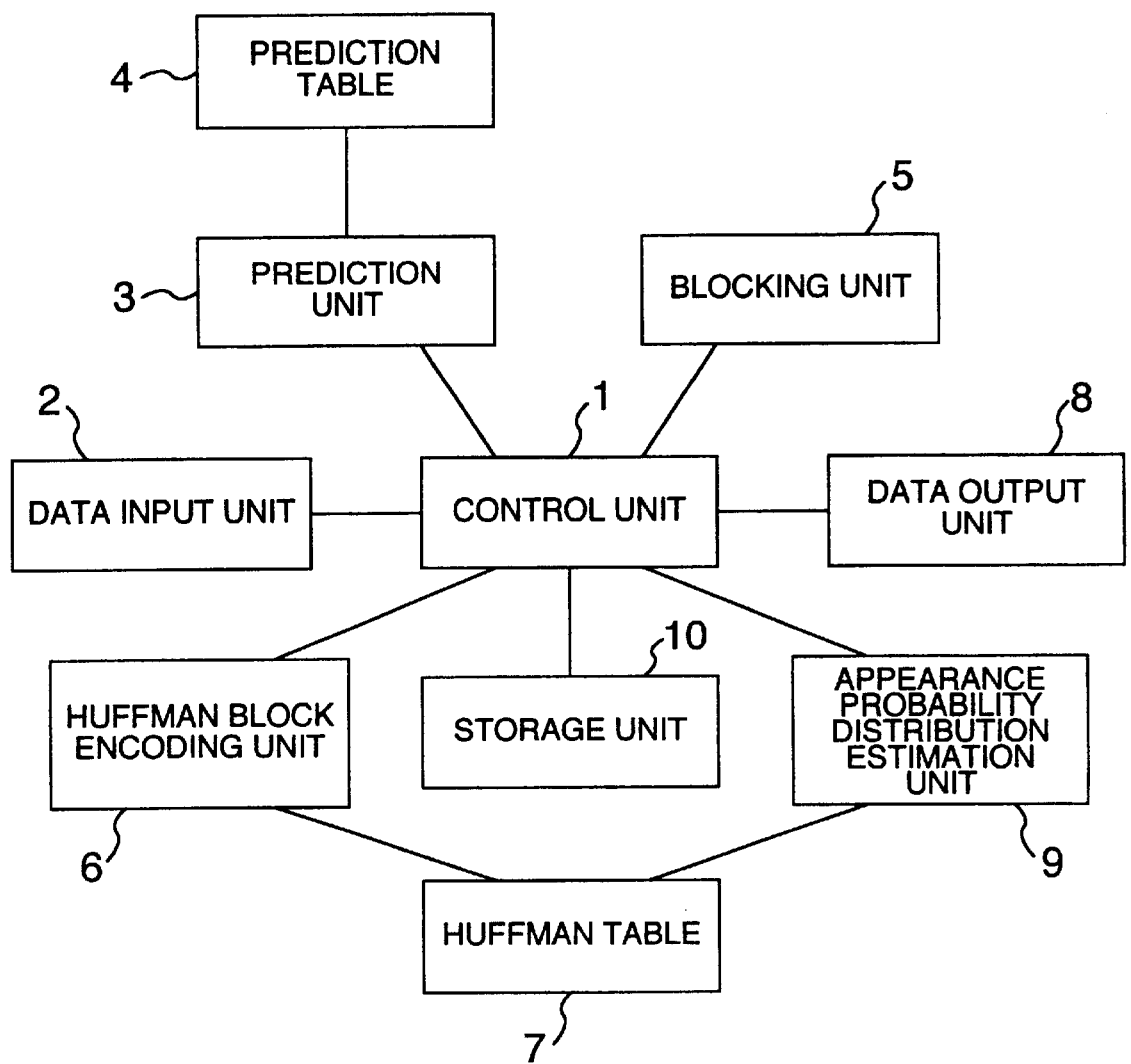
FIG. 1 is a block diagram illustrating a binary image encoding apparatus according to a first embodiment of the present invention.

FIG. 1 is a block diagram illustrating the configuration of a binary image encoding apparatus according to a first embodiment of the present invention.

Figure 11:
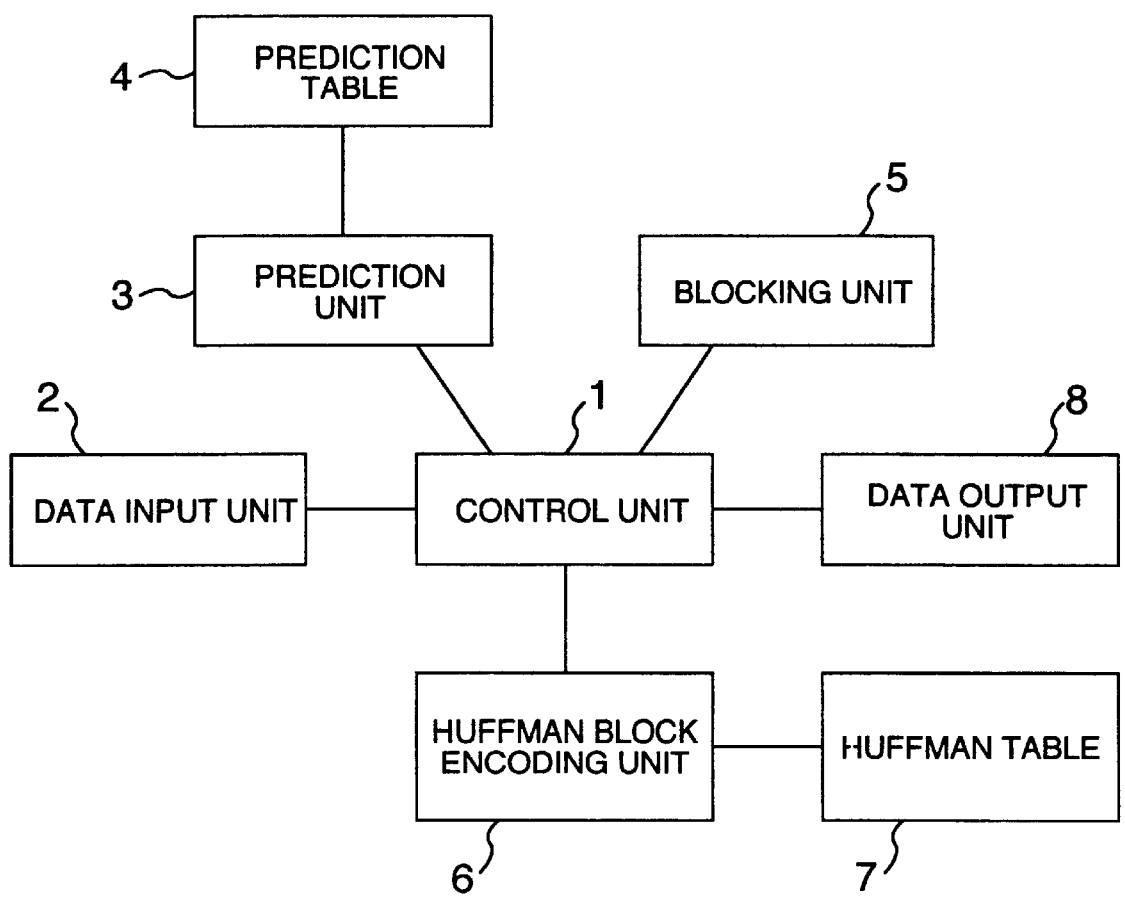
FIG. 11 is a block diagram illustrating a conventional binary image encoding apparatus which employs a conventional pseudo-gray scale binary image encoding method.

In FIG. 1, a control unit 1, a data input unit 2, a prediction unit 3, a prediction table 4, a blocking unit 5, a Huffman block encoding unit 6, Huffman tables 7, and a data output unit 8 are similar to those illustrated in FIG. 11, so that they are designated the same reference numerals, and description thereon is omitted. Reference numeral 9 designates an appearance probability distribution estimation unit for determining an appearance probability distribution model for values of blocked data of an encoding-target block with reference to values of blocked data around the encoding-target block. Reference numeral 20 designates a storage unit for storing a control program. The Huffman tables 7 are designed to be optimal tables for respective ones of a plurality of predefined appearance prediction distribution models.

The operation of the binary image encoding apparatus configured as described above will now be described with reference to FIG. 2. FIG. 2 is a flow chart illustrating the operation of the binary image encoding apparatus of FIG. 1.

The control unit 1 receives from the data input unit 2 binary image data which is an input image. Next, the control unit 1 transfers the binary image data to the prediction unit 3, and the prediction unit 3 conducts the prediction with reference to the prediction table 4 (S1). The output data of the prediction unit 3 is a data sequence indicative of the prediction hit or miss. The control unit 1 transfers the data sequence indicative of the prediction hit or miss to the blocking unit 5, and the blocking unit 5 converts the data sequence indicative of the prediction hit or miss to the blocked data which consists of M×N pixels (S2). Next, the control unit 1 transfers the blocked data to the Huffman block encoding unit 6, and the Huffman block encoding unit 6 sequentially encodes the blocked data. In this event, the control unit 1 transfers the blocked data around the encoding-target block to the appearance probability distribution estimation unit 9 in association with the operation of the Huffman block encoding. The appearance probability distribution estimation unit 9 determines an appearance probability distribution model for the values of the blocked data around the encoding-target block with reference to the blocked data around the encoding-target block (S3). The Huffman block encoding unit 6 selects the Huffman table designed optimally to the probability distribution model estimated by the appearance probability distribution estimation unit 9 from the Huffman tables 7, and applies the Huffman block encoding to the encoding-target block using the selected Huffman table (S4). Finally, the control unit 1 outputs the compressed data from the data output unit 8. As to the operation of the control unit 1, it is also contemplated that the storage unit 10 for storing the control program for controlling the operation of the control unit 1 may be connected to the control unit 1 such that the control unit 1 controls the operation of each module (each functional block constituting the apparatus) in accordance with the control program stored in the storage unit 10.

Next, each of the constituent blocks will be described in a specific manner.

The prediction unit 3 predicts whether the encoding-target pixel is "0" or "1" based on the already-encoded surrounding pixels around the encoding-target pixel with reference to the prediction table 4. The already-encoded surrounding pixels for use in the prediction may be four surrounding pixels, four or more surrounding pixels, or the like. FIG. 3A is a diagram showing the reference pixels, and FIG. 3B is a diagram showing an example of the prediction table (the table which stores the predicted values) when four surrounding pixels are used as the reference pixels. The address of the prediction table can be calculated from the states of surrounding pixels X1–X4, and the prediction table can be referenced to find a predicted value X0 for a pixel X. The prediction is conducted in such a manner that "0" is returned when the predicted value X0 is coincident with the actual pixel value X, while "1" is returned when both values are different.

The blocking unit 5 converts a data sequence, which indicates the prediction hit or miss in the foregoing prediction, to the blocked data which is formed in blocks of M×N pixels. Since each pixel is one-bit data indicative of the prediction hit or miss, the blocked data formed in one block of M×N pixels is the data sequence comprised of M×N bits. Alternatively, the blocked data may have a variable block size. For example, when a plurality of consecutive blocks exhibit the prediction hits, the plurality of blocks may be grouped into one block, and a Huffman table may be created corresponding to such a block to implement the encoding.

The appearance probability distribution estimation unit 9 determines the appearance probability distribution model for the encoding-target block. The determination of the model is performed with reference to the blocked data around the encoding-target block. For example, the method of determining the appearance probability distribution model may rely on the number of pixels indicative of the prediction misses included in four surrounding blocks around the encoding-target block.

Figure 4:
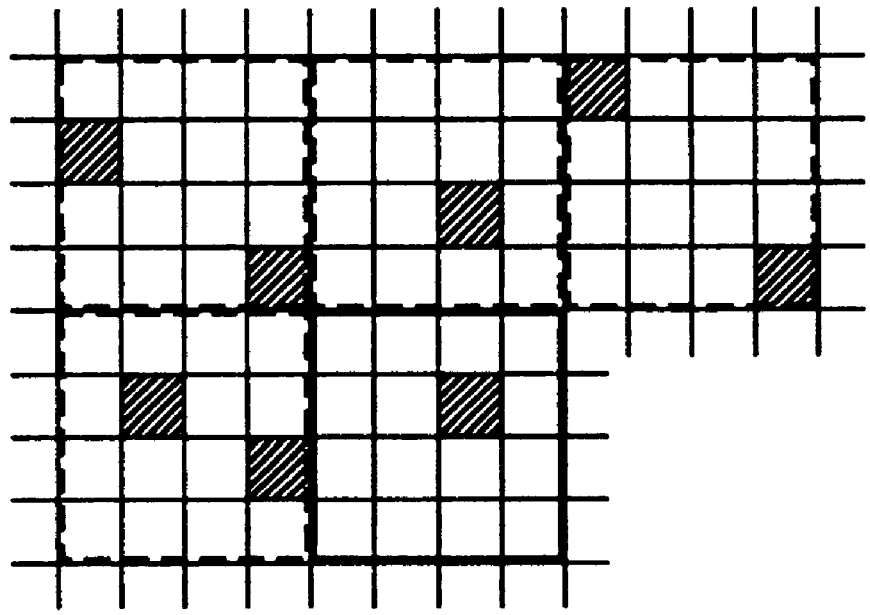
FIG. 4 is a diagram for explaining reference blocks around an encoding-target block used for the determination of an appearance probability distribution model when a binary image is blocked in 4×4 pixels.

FIG. 4 is a diagram for explaining the surrounding reference blocks around the encoding-target block for use in determining the appearance probability distribution model when the binary image is blocked in 4×4 pixels. Blocks surrounded by dotted lines represent the reference blocks, and a block surrounded by a solid line represents the encoding-target block. When one block is comprised of 16 pixels arranged in 4×4 matrix, the number of the prediction miss pixels included in the four surrounding blocks is 64 at maximum. Therefore, the appearance probability distribution model for the encoding-target block is determined from 64 models in accordance with the number of the prediction miss pixels included in the four surrounding blocks. In the case shown in FIG. 4, since seven prediction-miss pixels are included in the reference blocks, the appearance probability distribution model for the encoding-target block is determined to be the seventh model. It is also contemplated herein that the method of determining the appearance probability distribution model may rely on referencing to immediately surrounding prediction hit/miss data, rather than referencing to blocked data around the encoding-target block.

Finally, the Huffman block encoding unit 6 applies the Huffman block encoding to the encoding-target block. The Huffman block encoding is performed using a Huffman table selected from the Huffman tables 7 as designed optimally to the appearance probability distribution model determined by the probability distribution estimation unit 9. As shown in FIG. 4, when the binary image is blocked in 4×4 pixels and the appearance probability distribution model is determined in reliance on the number of the prediction-miss pixels in four surrounding blocks, the Huffman tables 7 store 64 Huffman tables designed optimally for the respective models. The Huffman tables may be created by previously preparing them using learning images, using intended images for optimization, and so on.

As described above, the first embodiment comprises the predicting step (S1) for predicting the binary image; the blocking step (S2) for blocking the data sequence, which indicates the prediction hit or miss in the predicting step, to produce the blocked data; the model determination step (S3) for determining the appearance probability distribution model with reference to the blocked data around the Huffman-block-encoding-target block; and the encoding step (S4) for selecting the Huffman table optimally designed for the determined appearance probability distribution model from the previously created Huffman tables to the Huffman-block-encoding-target block. Thereby, it is possible to estimate the appearance probability distribution for the values of the blocked data in the encoding-target block from the surrounding blocked data, and to perform the Huffman block encoding using the Huffman table optimal to the estimated appearance probability distribution model. It is therefore possible to accomplish the higher compression ratio in the binary image encoding.

Also, the binary image encoding apparatus according to the first embodiment comprises the prediction unit 3 for predicting the binary image; the blocking unit 5 for blocking the data sequence, which indicates the hit or miss for the prediction performed by the prediction unit 3, to produce the blocked data; the appearance probability distribution estimation unit 9 for determining the appearance probability distribution model with reference to the blocked data around the Huffman-block-encoding-target block; the Huffman block encoding unit 6 for selecting the Huffman table optimally designed for the determined appearance probability distribution model from the previously created Huffman tables to apply the Huffman block encoding to the encoding-target block; and the control unit 1 for controlling the overall apparatus. Thereby, it is possible to estimate the appearance probability distribution for the values of the blocked data in the encoding-target block from the surrounding blocked data, and to perform the Huffman block encoding using the Huffman table optimal to the estimated appearance probability distribution model. It is therefore possible to accomplish the higher compression ratio in the binary image encoding.

Second Embodiment

Figure 5:
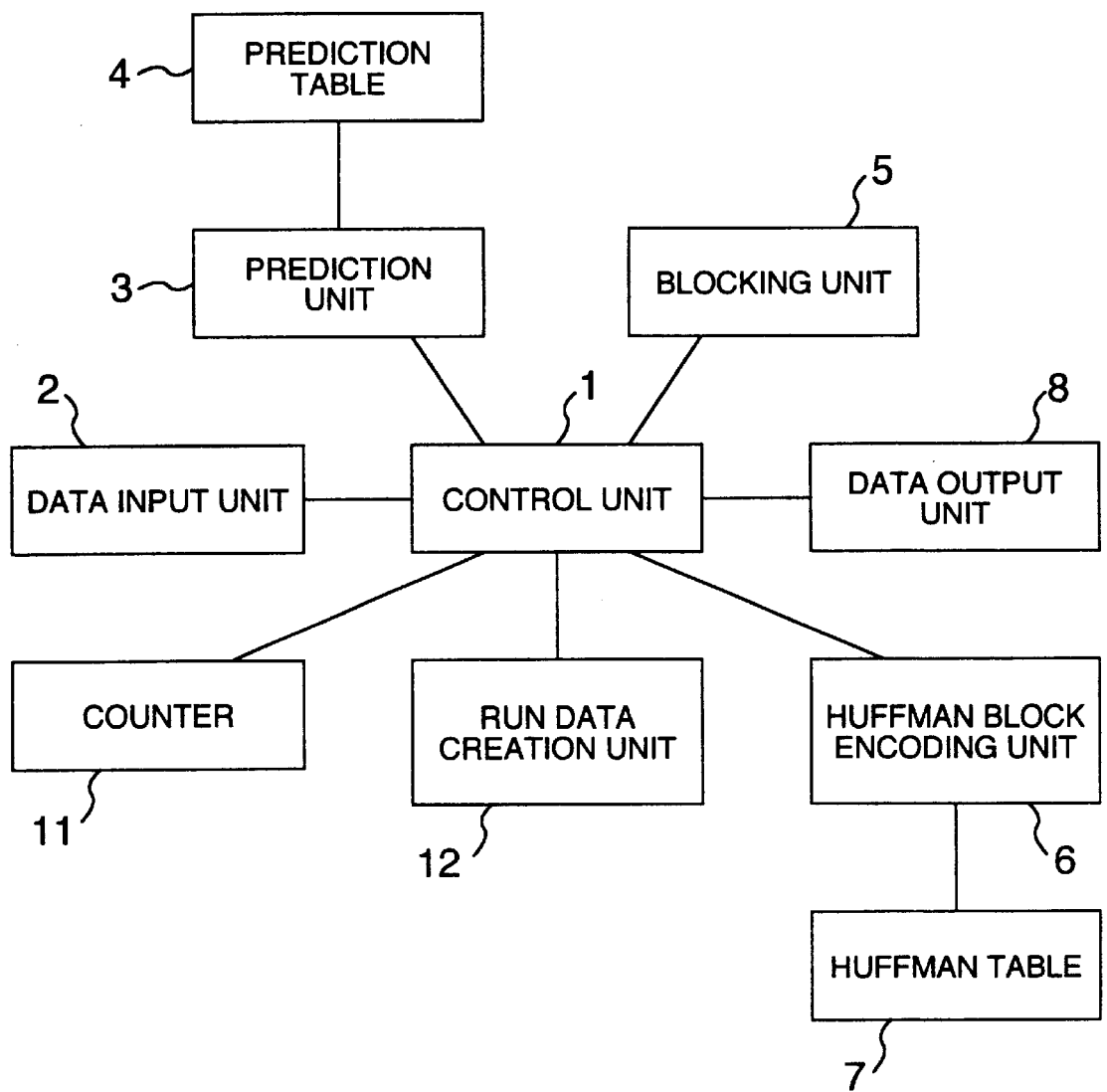
FIG. 5 is a block diagram illustrating a binary image encoding apparatus according to a second embodiment of the present invention.

FIG. 5 is a block diagram illustrating the configuration of a binary image encoding apparatus according to a second embodiment of the present invention.

In FIG. 5, a control unit 1, a data input unit 2, a prediction unit 3, a prediction table 4, a blocking unit 5, a Huffman block encoding unit 6, Huffman tables 7, and a data output unit 8 are similar to those illustrated in FIG. 11, so that they are designated the same reference numerals, and description thereon is omitted. Reference numeral 11 designates a counter for counting the number of consecutive blocks, in which all of the predictions are hit, within the blocked data sequence. Reference numeral 12 denotes a run data creation unit for converting the blocked data to the run data when the blocks in which all of the predictions are hit appear in succession.

Figure 6:
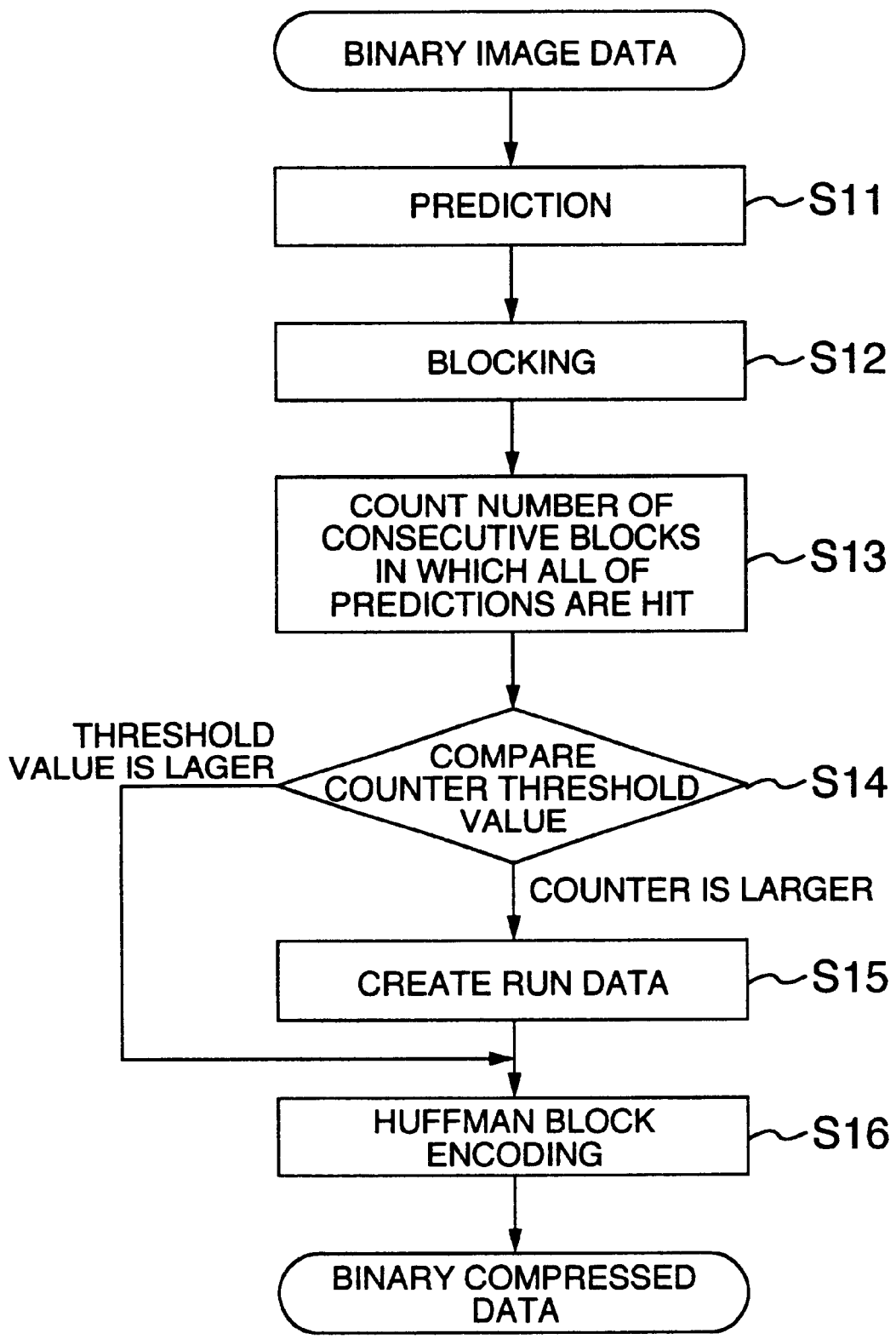
FIG. 6 is a flow chart illustrating the operation of the binary image encoding apparatus of FIG. 5.

The operation of the binary image encoding apparatus configured as described above will now be described with reference to FIG. 6. FIG. 6 is a flow chart illustrating the operation of the binary image encoding apparatus of FIG. 5.

The control unit 1 receives from the data input unit 2 binary image data which is an input image. Next, the control unit 1 transfers the binary image data to the prediction unit 3, and the prediction unit 3 conducts the prediction with reference to the prediction table (S11). The output data of the prediction unit 3 is the data sequence which indicates the prediction hit or miss. The control unit 1 transfers the data sequence indicative of the prediction hit or miss to the blocking unit 5, and the blocking unit 5 converts the data sequence indicative of the prediction hit or miss to the blocked data formed in M×N pixels (S12). Next, the control unit 1 calls the counter 11, and the counter 11 counts the number of the consecutive blocks when the blocks in each of which all of the predictions are hit continue (S13). The control unit 1 compares with the predefined threshold value the number of the consecutive blocks in each of which all of the predictions are hit, the number being counted by the counter 11 (S14). If the number of the consecutive blocks in each of which all of the predictions are hit is larger than the threshold value, the control unit 1 calls the run data creation unit 12 to convert the blocked data sequence to the run data (S15). Subsequently, the control unit 1 transfers data to the Huffman block encoding unit 6. The Huffman block encoding unit 6, using the Huffman table 7, applies the Huffman block encoding to the blocked data when the number of the consecutive blocks in each of which all of the predictions are hit is smaller than the threshold value, and applies the Huffman block encoding to the run data when the number of the consecutive blocks in each of which all of the predictions are hit is larger than the threshold value (S16). Finally, the controller 1 outputs the compressed data from the data output unit 8.

Next, the counter 11 and the run data creation unit 12 will be described in a specific manner.

The counter 11 counts the number of the consecutive blocks when the blocks in each of which all of the predictions are hit appear in succession.

FIG. 7 is a diagram for explaining how to count the number of the consecutive blocked data. If it is assumed that the number of the consecutive blocks in each of which all of the predictions are hit, for the data sequence subjected to the blocking process in 4×2 pixels, as shown in FIG. 7, then five blocks are counted. Here, if the threshold value is equal to "2", for example, then the number of the consecutive blocks is larger than the threshold value, so that the Huffman block encoding is performed as the run data to the number of the subsequent consecutive blocks in each of which all of the predictions are hit. On the other hand, if the threshold value is equal to "8", for example, then the number of the consecutive blocks is smaller than the threshold value, so that the Huffman block encoding is performed as the blocked data. It is contemplated that the magnitude of the threshold value may be switched depending on whether the image to be encoded is a natural image or a CG image. With the threshold value set at "2", the occurrence of two consecutive blocks in each of which all of the predictions are hit serves as a flag showing that run data begins. Responsively, the counter 11 counts the number of the consecutive blocks in each of which all of the predictions are hit. As an alternative to the method of scanning when the number of the consecutive blocks is counted, FIG. 8 shows an exemplary method of scanning in an order other than in the raster order.

FIG. 8 is a diagram for explaining the scanning order for counting the number of the consecutive blocked data. It is contemplated that the Hilbert scanning order as shown in FIG. 8 advantageously reduces the local redundancy of the image and takes a longer run, so that the compression ratio can be improved. When the number of the consecutive blocks in each of which all of the predictions are hit, the number being counted by the counter 11, exceeds the threshold value, the run data representative of the number of the subsequent consecutive blocks in each of which all of the predictions are hit are produced.

FIGS. 9A–9E are diagrams for explaining the blocked data and the run data when the threshold value is equal to "2". Since the blocked data consists of 8 pixels in the form of 4×2 matrix, this is 8-bit data. As shown in FIG. 9A, it is assumed that for the 8-bit data, data at the upper left position of the block is designated as MSB, while data at the lower right position of the same as LSB, and that a prediction-hit pixel is set to "0", while a prediction-miss pixel is set to "1". For example, the first block can be regarded as having all the bits set at "0" except for the third bit on the upper line being "1", so that this data block may be expressed as "0x20" in 8-bit data. Each blocked data is formed in this way. FIG. 9C shows the blocked data created from the data formed as shown in FIG. 9B in blocks. When the threshold value is equal to "2", two consecutive blocks in each of which all of the predictions are hit are followed by the run data indicating the number of the consecutive blocks in each of which all of the predictions are hit. FIG. 9D shows the run data created from the blocked data shown in FIG. 9C. Specifically, "0x03" following two consecutive blocks of "0x00" indicates that three blocks in each of which all of the predictions are hit continue subsequent thereto. Here, since the blocked data consists of 8 pixels as shown in FIG. 9B, the blocked data indicative of the prediction hit or miss is 8-bit data. When the run data indicative of the number of the consecutive blocks in each of which all of the predictions are hit is represented as having the maximum length of "255", the run data can be represented as 8-bit data, so that it can be encoded with the same table as that used for the Huffman block encoding. It should be noted however that the appearance frequency of each run length is different from that of the blocked data, so that a correspondence table may be created in consideration of the appearance frequencies of the run length and blocked data to improve the encoding efficiency.

FIG. 10 shows an exemplary correspondence table showing the respective run lengths and which of the Huffman codes is used when the maximum run length is "255". This correspondence table is organized such that the Huffman code "0x00" having the highest appearance frequency of the blocked data is assigned to the run length "255" having the highest appearance frequency, and the Huffman code "0xFF" having the lowest appearance of the blocked data is assigned to the run length "254" having the lowest appearance frequency. When the run data is created using the correspondence table shown in FIG. 10, "0x80" is assigned to "0x03" of FIG. 9D, as shown in FIG. 9E. Then, the Huffman block encoding is applied to the run data created in the foregoing manner.

As described above, according to the second embodiment, by providing the predicting step (S11) for predicting the binary image; the blocking step (S12) for blocking the data sequence, which indicates the prediction hit or miss in the predicting step, to produce the blocked data; the converting steps (S14, S15) for converting the blocked data to the run data indicative of the number of the consecutive blocks in each of which all of the predictions are hit, when the number of the consecutive blocks in each of which all of the predictions for pixels within the block of the blocked data are hit exceeds the threshold value; and the encoding step (S16) for applying the Huffman block encoding to the run data when the blocked data is converted to the run data in the converting step, and for applying the Huffman block encoding to the blocked data when the blocked data is not converted to the run data, the plurality of blocks can be collectively subjected to the Huffman block encoding as the run data when the plurality of blocks in each of which all of the predictions are hit appear in succession. Thereby, it is possible to accomplish the binary image encoding at the higher compression ratio.

Also, by providing the prediction unit 3 for predicting the binary image; the blocking unit 5 for blocking the data sequence, which indicates the prediction hit or miss in the prediction unit 3, to produce the blocked data; the run data creation unit 12 for converting the blocked data to the run data indicative of the number of the consecutive blocks in each of which all of the predictions are hit when the number of the consecutive blocks in each of which all of the predictions for pixels within the block of the blocked data are hit exceeds the threshold value; the Huffman block encoding unit 6 for applying the Huffman block encoding to the run data when the run data creation unit 12 has converted the blocked data to the run data, and for applying the Huffman block encoding to the blocked data when the run data creation unit 12 does not convert the blocked data to the run data; and the control unit 1 for controlling the overall apparatus, the plurality of blocks can be collectively subjected to the Huffman block encoding as the run data when the plurality of blocks in each of which all of the predictions are hit. Thereby, it is possible to accomplish the binary image encoding at the higher compression ratio.

Third Embodiment

Figure 14:
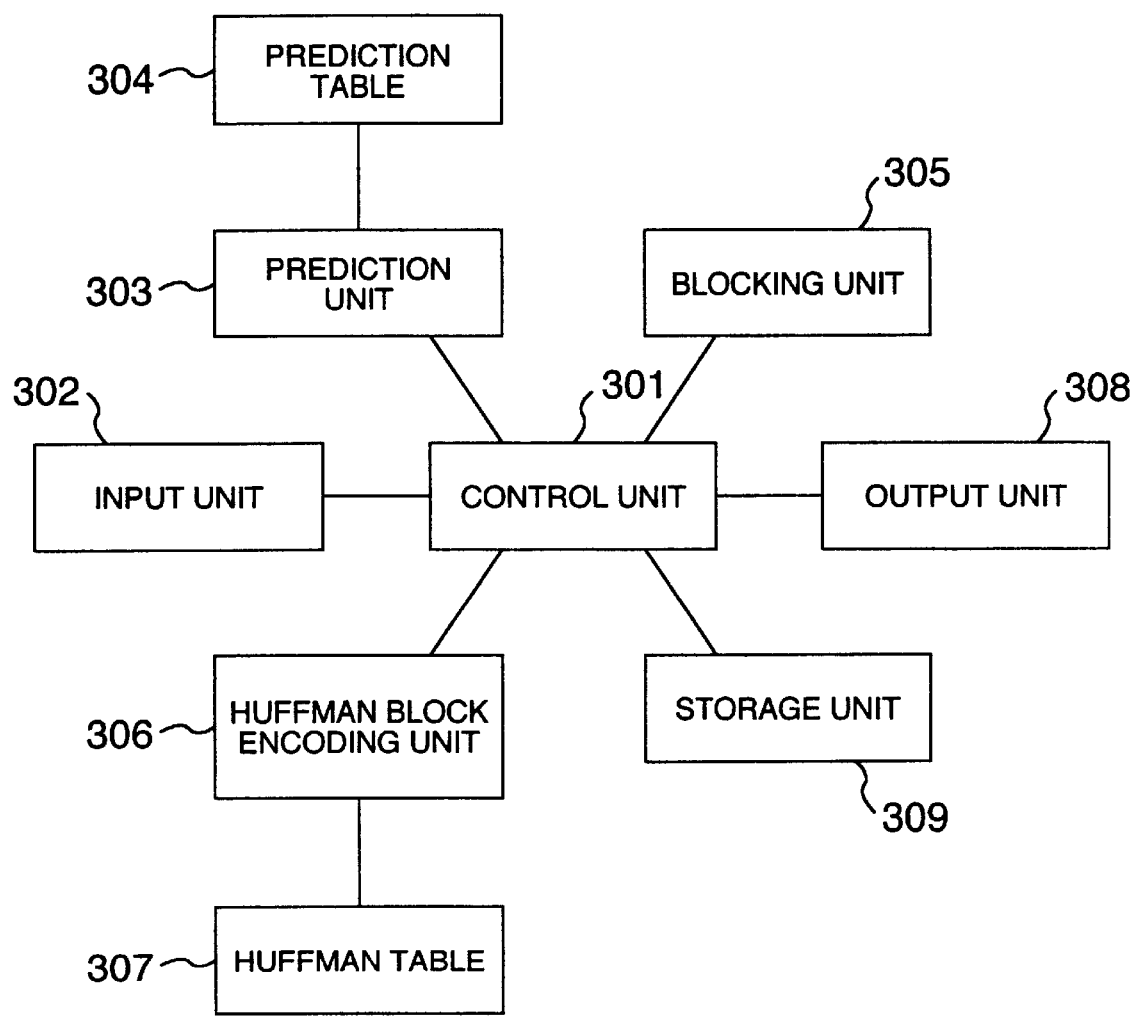
FIG. 14 is a block diagram illustrating the configuration of a binary image encoding apparatus according to a third embodiment of the present invention.
Figure 15:
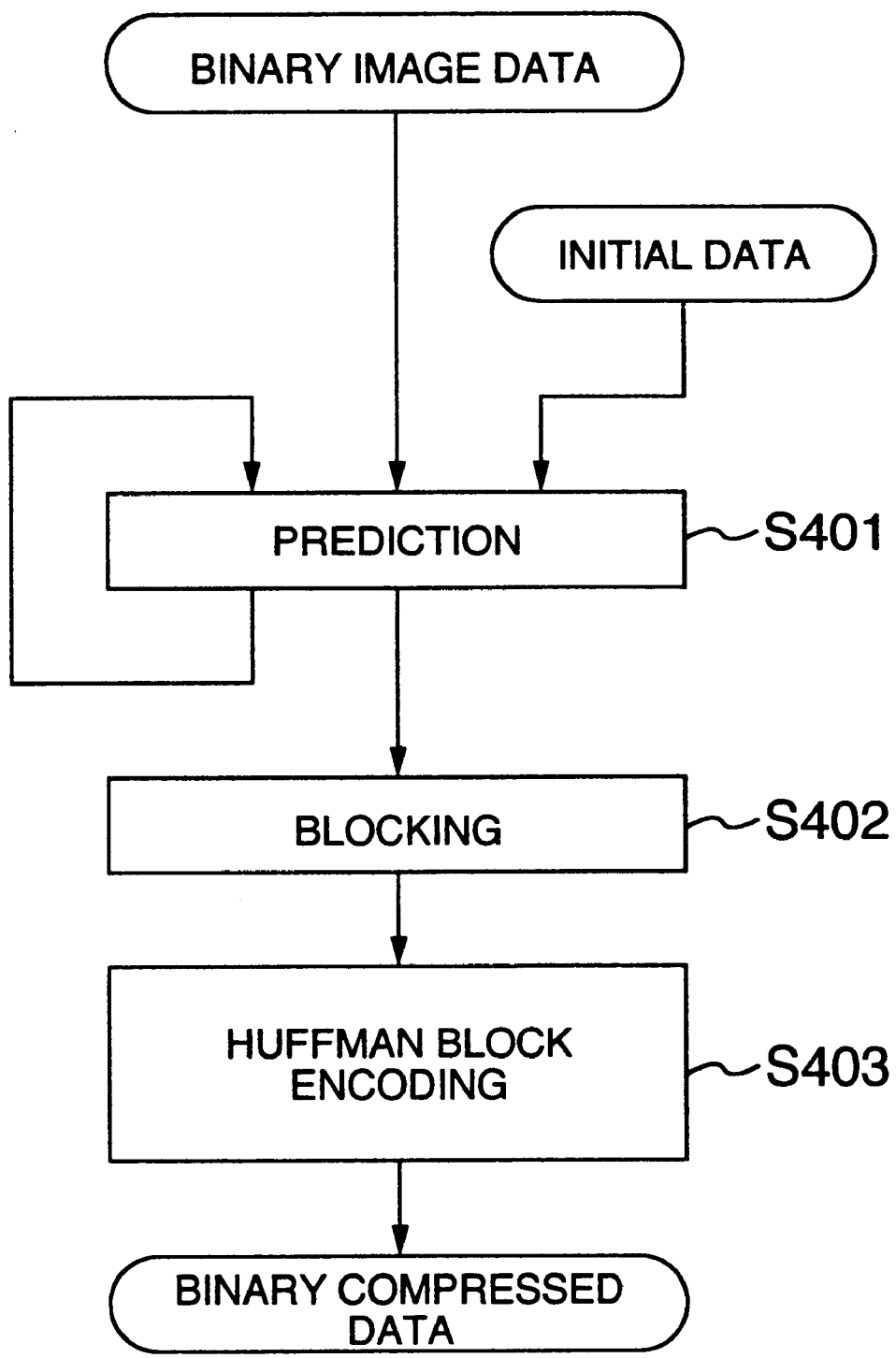
FIG. 15 is a flow chart illustrating the operation of the binary image encoding apparatus of FIG. 14.

FIG. 14 is a block diagram illustrating the configuration of a binary image encoding apparatus according to a third embodiment of the present invention. FIG. 15 is a flow chart illustrating the operation of the binary image encoding apparatus of FIG. 14. FIG. 16A is a diagram for explaining reference pixels in the prediction of a binary image. FIG. 16B is a diagram for explaining reference prediction error data in the prediction of a binary image. FIG. 16C is a diagram for explaining an exemplary prediction table. FIG. 17 is a diagram for explaining how a data sequence is blocked through the prediction of a binary image.

As illustrated in FIG. 14, the binary image encoding apparatus according to the third embodiment comprises: an input unit 302 for receiving binary image data; a prediction unit 303 for predicting a binary image for each encoded pixel with reference to a prediction table 304 based on surrounding binary image data around the encoding-target pixel and prediction error data for the already-encoded pixels to produce a data sequence which indicates a prediction hit or miss; a blocking unit 305 for blocking the data sequence produced in the prediction unit 303; a Huffman block encoding unit (entropy encoding means) 306 for applying the Huffman block encoding (entropy encoding) to the blocked data sequence using a Huffman table (table) 307; an output unit 308 for outputting the Huffman-block-encoded binary compressed data; a control unit 301 for controlling the operation of the apparatus; and a storage unit 309 for storing a control program executed by the control unit 301.

It should be noted that the present invention is not limited to the Huffman block encoding but may employ any other encoding such as MH, MR encoding as long as it belongs to the category of the entropy encoding.

Next, the flow of the processing in the binary image encoding apparatus configured as described above will be described with reference FIG. 15.

The control unit 301 receives from the input unit 302 the binary image data which is an input image. Next, the prediction unit 303 predicts the binary image data from the data sequence indicative of the prediction hit or miss with reference to the prediction table 304 (S401). Here, since no data sequence indicative of the prediction hit or miss exists in an initial state, substitute initial data is applied to the prediction unit 303. The output data of the prediction unit 303 is the data sequence indicative of the prediction hit or miss.

The control unit 301 transfers the data sequence indicative of the prediction hit or miss to the blocking unit 305. The blocking unit 305 converts the data sequence indicative of the prediction hit or miss to the blocked data which consists of M×N pixels (S402).

Next, the control unit 301 transfers the blocked data to the Huffman block encoding unit 306. The Huffman block encoding unit 306 applies the Huffman block encoding to the blocked data using the Huffman table 307 (S403). Finally, the control unit 301 outputs the compressed data from the output unit 308.

In this configuration, the storage unit 309 for storing the control program for controlling these operations may be provided in the control unit 301 such that the control unit 301 controls the operation of each module (each functional block constituting the apparatus) in accordance with the control program stored in the storage unit 309.

Next, the respective blocks will be described in a specific manner.

The prediction unit 303 predicts whether the encoding-target pixel is "0" or "1" with reference to the prediction table 304 based on the surrounding already-encoded pixels around the encoding-target pixel and the prediction error data for the already-encoded pixels. Here, the surrounding already-encoded pixels for use in the prediction may be two surrounding pixels, two or more surrounding pixels, or the like. Also, the prediction error data for use in the prediction may be the prediction error data for two surrounding pixels or the prediction error data for two or more surrounding pixels.

Now, FIGS. 16A–16C show an exemplary prediction table which may be provided when two surrounding pixels are employed as the reference pixels, and the reference prediction error data is produced for two surrounding pixels. Alternatively, it is contemplated that as the surrounding reference pixels, every several pixels may be—referenced, and that the number of the reference pixels may be different from the number of the reference prediction error data.

Referring specifically to FIGS. 16A–16C, the prediction table address is calculated from the states of surrounding pixels X1 and X2 and surrounding prediction error data E1 and E2. Then, referring to the predictive table 304, a predicted value X0 can be found for a pixel X. The prediction is conducted in such a manner that "0" is returned when the predicted value X0 is coincident with the actual pixel value X, while "1", is returned when both values are different.

The blocking unit 305 converts the data sequence, which indicates the prediction hit or miss, to the blocked data in which one block consists of M×N pixels, in order to extend the information sources.

FIG. 17 shows an example in which the data sequence is blocked such that one block consists of 4×4 pixels. Since each pixel is one-bit data indicative of the prediction hit or miss, the blocked data formed in one block of M×N pixels is the data sequence of M×N bits. Alternatively, the blocked data may have a variable block size. For example, when a plurality of consecutive blocks indicates the prediction hits, the plurality of blocks may be grouped into one block, and a Huffman table may be created corresponding to such a block to implement the encoding.

Finally, the Huffman block encoding unit 306 applies the Huffman block encoding to the encoding-target block. The Huffman block encoding is performed using the Huffman table 307 designed optimally to the appearance frequency of each block. The Huffman tables 307 may be created optimally to each image, created previously using learning data, and so on. In addition, the Huffman tables 307 may be switched depending on information on the surrounding pixels.

As described above, according to the third embodiment, the prediction of the binary image for the encoding-target pixel is performed using the surrounding binary image data and the prediction error data for the already-encoded pixels. Thereby, it is possible to perform the binary image encoding at the higher compression ratio.

Fourth Embodiment

Figure 18:
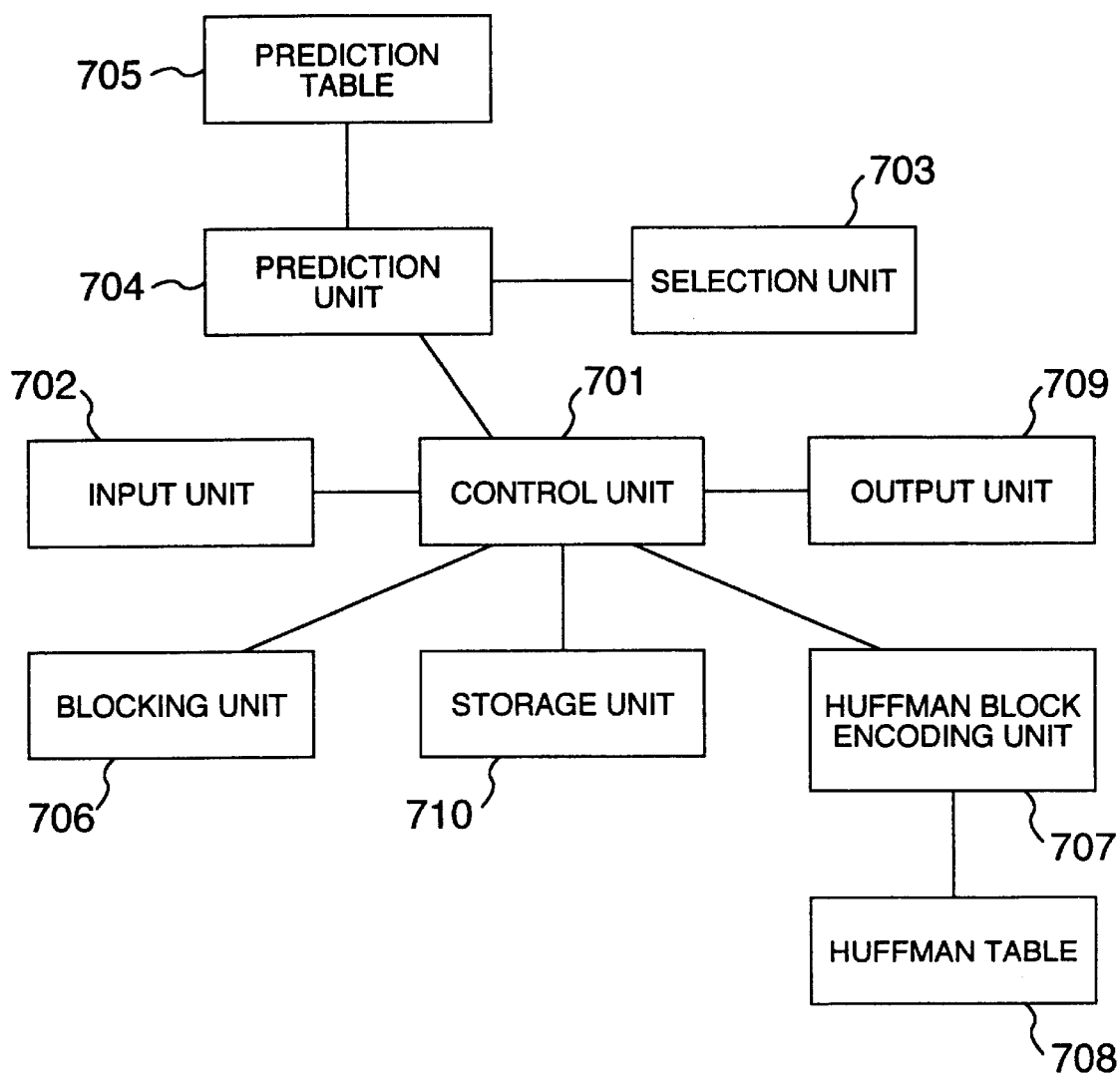
FIG. 18 is a block diagram illustrating the configuration of a binary image encoding apparatus according to a fourth embodiment of the present invention.
Figure 19:
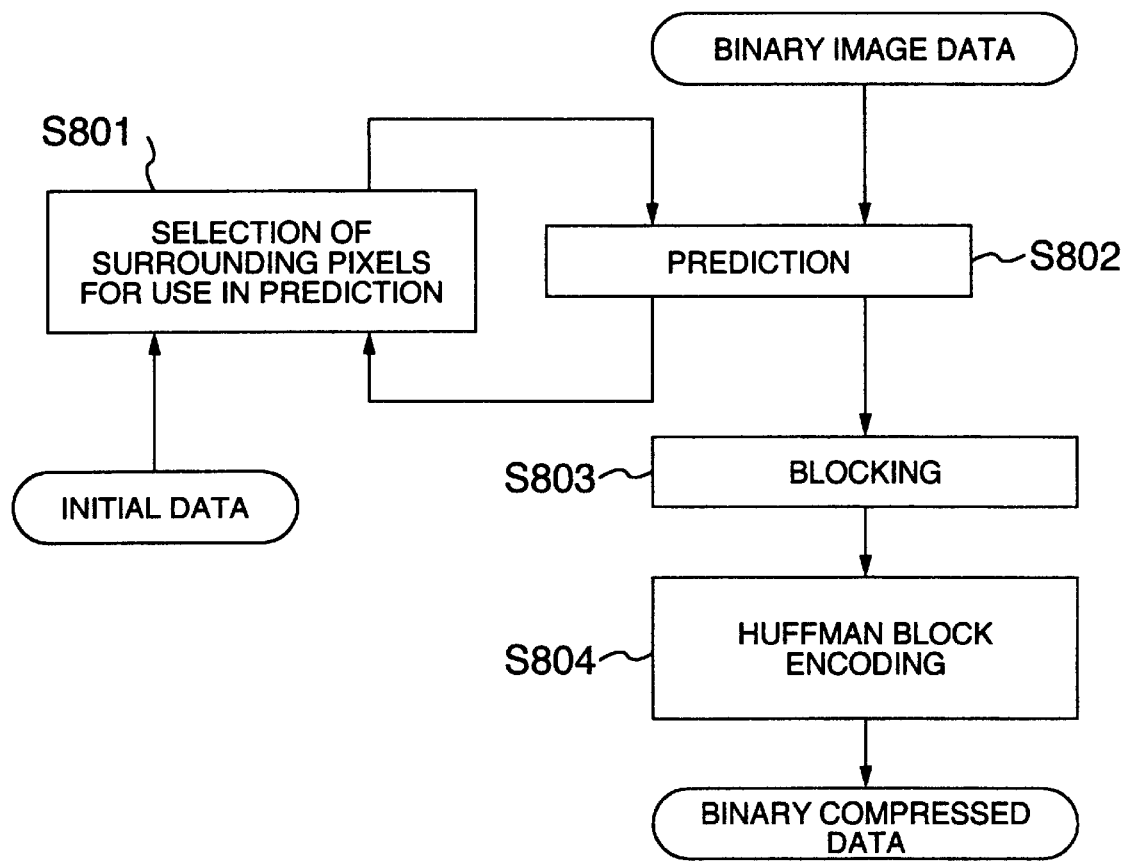
FIG. 19 is a flow chart illustrating the operation of the binary image encoding apparatus of FIG. 18.
Figure 20:
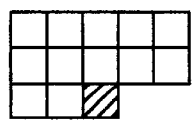
FIG. 20 is a diagram for explaining an example of the prediction reference pixels for use in selecting the prediction reference pixels in the binary image encoding apparatus of FIG. 18.
Figure 21A:
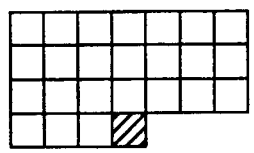
FIG. 21A is a diagram for explaining an example of the prediction reference pixels for use in predicting the binary image with the same table.
Figure 21B:
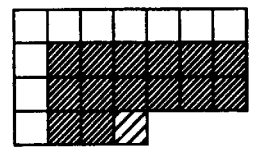
FIG. 21B is a diagram for explaining an example of the reference pixels for use in the prediction selected in accordance with a prediction error.

FIG. 18 is a block diagram illustrating the configuration of a binary image encoding apparatus according to a fourth embodiment of the present invention. FIG. 19 is a flow chart illustrating the operation of the binary image encoding apparatus of FIG. 18. FIG. 20 is a diagram for explaining exemplary prediction reference pixels for use in selecting prediction reference pixels in the binary image encoding apparatus of FIG. 18. FIG. 21A is a diagram for explaining exemplary prediction reference pixels for use in predicting a binary image with the same table. FIG. 21B is a diagram for explaining exemplary reference pixels for use in a prediction, selected in accordance with a prediction error.

Referring first to FIG. 18, the binary image encoding apparatus according to the fourth embodiment comprises: an input unit 702 for receiving binary image data; a selection unit 703 for selecting surrounding binary image data for use in the prediction from a data sequence indicative of a prediction hit or miss for each of already-encoded pixels around an encoding-target pixel; a prediction unit 704 for predicting a binary image for the encoding-target pixel with reference to the result of selection in the selection unit 703 and a prediction table 705 to produce a data sequence indicative of a prediction hit or miss; a blocking unit 706 for blocking the data sequence produced in the prediction unit 704; a Huffman block encoding unit (entropy encoding means) 707 for applying the Huffman block encoding (entropy encoding) to the blocked data sequence using a Huffman table (table) 708; an output unit 709 for outputting the Huffman-block-encoded binary compressed data; a control unit 701 for controlling the operation of the apparatus; and a storage unit 710 for storing a control program executed by the control unit 701.

Next, the flow of processing in the binary image encoding apparatus configured as described above will be described with reference FIG. 19.

The control unit 701 receives from the input unit 702 the binary image data which is an input image. The selection unit 703 selects the reference pixels for use in the prediction from the data sequence indicative of prediction hit or miss in the already-encoded pixels around the encoding-target pixel (S801). Here, since there are no already-encoded pixels in an initial state, the selection unit 703 is applied with an initial data sequence in place of the data sequence indicative of the prediction hit or miss.

Next, the control unit 701 transfers the input data and the reference pixel data selected by the selection unit 703 to the prediction unit 704. The prediction unit 704 conducts the prediction using the prediction table 705 and the reference pixel data (S802). The output data of the prediction unit 704 is the data sequence indicative of the prediction hit or miss. The data sequence indicative of the prediction hit or miss is transferred to the selection unit 703 and the blocking unit 706 by the control unit 701.

The blocking unit 706 converts the data sequence indicative of the prediction hit or miss to the blocked data which consists of M×N pixels (S803).

Subsequently, the control unit 701 transfers the blocked data to the Huffman block encoding unit 707. The Huffman block encoding unit 707 applies the Huffman block encoding to the blocked data using the Huffman table 708 (S804). Finally, the control unit 701 outputs the compressed data from the output unit 709.

In this configuration, the storage unit 710 for storing the control program for controlling these operation may be provided in the control unit 701 such that the operation of each module is controlled in accordance with the control program stored in the storage unit 710.

Next, the selection unit 703 and the prediction unit 704 will be described in a specific manner.

The selection unit 703 selects the surrounding pixels for use in the prediction from the prediction error data around the encoding-target pixel. The selection may be determined, for example, in accordance with the number of the prediction miss pixels in the prediction error data for 12 pixels around the encoding-target pixel, as shown in FIG. 9. Since the number of the prediction miss pixels less than a threshold value means that the associated region exhibits the higher likelihood of the prediction hit, dots are periodically arranged with the high probability. Therefore, in order to correctly estimate the appearance frequency, the widest possible region may be selected as the reference pixels for use in the prediction to accomplish the highly accurate prediction. It should be noted that there are no surrounding pixels in the initial state. In other words, since there are no prediction error data, the selection unit 703 does not operate unless the initial value is applied thereto. It is therefore contemplated to find how the prediction error is in the average image, and to apply the selection unit 703 with the resultant prediction error data as the initial value.

The prediction unit 704 predicts the encoding-target pixel using the selected reference pixels and the prediction table. However, when the wide range of the surrounding pixel data is selected by the selection unit 703, the dot appearance frequency may be estimated from the surrounding pixel data so that the table appropriate to the dot appearance frequency is selected to perform the prediction from the neighboring pixels. Thereby, it is possible to realize the highly accurate prediction with the table of the smaller size.

FIGS. 21A and 21B show the examples of the reference pixels. When the prediction is performed with reference to 24 pixels using the same prediction table as shown in FIG. 21A, the size required for the prediction table amounts to $2^{24}$ bits (=2 MB). On the other hand, when the selection unit 3 regards the wide range of the surrounding pixels as the region exhibiting the higher likelihood of the prediction hit and 24 surrounding pixels are selected as the reference pixels, the dot appearance probability is found from the 24 surrounding pixels as shown in FIG. 21B, and the range is separated, for example, into 64 in accordance with the found probability. Then, the prediction is performed with reference to 12 surrounding pixels using the optimal tables for the respective pixels. In this event, the size of the prediction tables is calculated as $2^{12} \times 64$ bits (=32 kB), so that the highly accurate prediction can be accomplished with the very small number of the tables.

As described above, the binary image encoding apparatus according to the fourth embodiment predicts the binary image for the encoding-target pixel using the smaller number of the surrounding pixels selected as the reference pixels for use in the prediction from the prediction error data for the already-encoded pixels. Thereby, it is possible to accomplish the high speed binary image encoding at the higher compression ratio.

Fifth Embodiment

Figure 22:
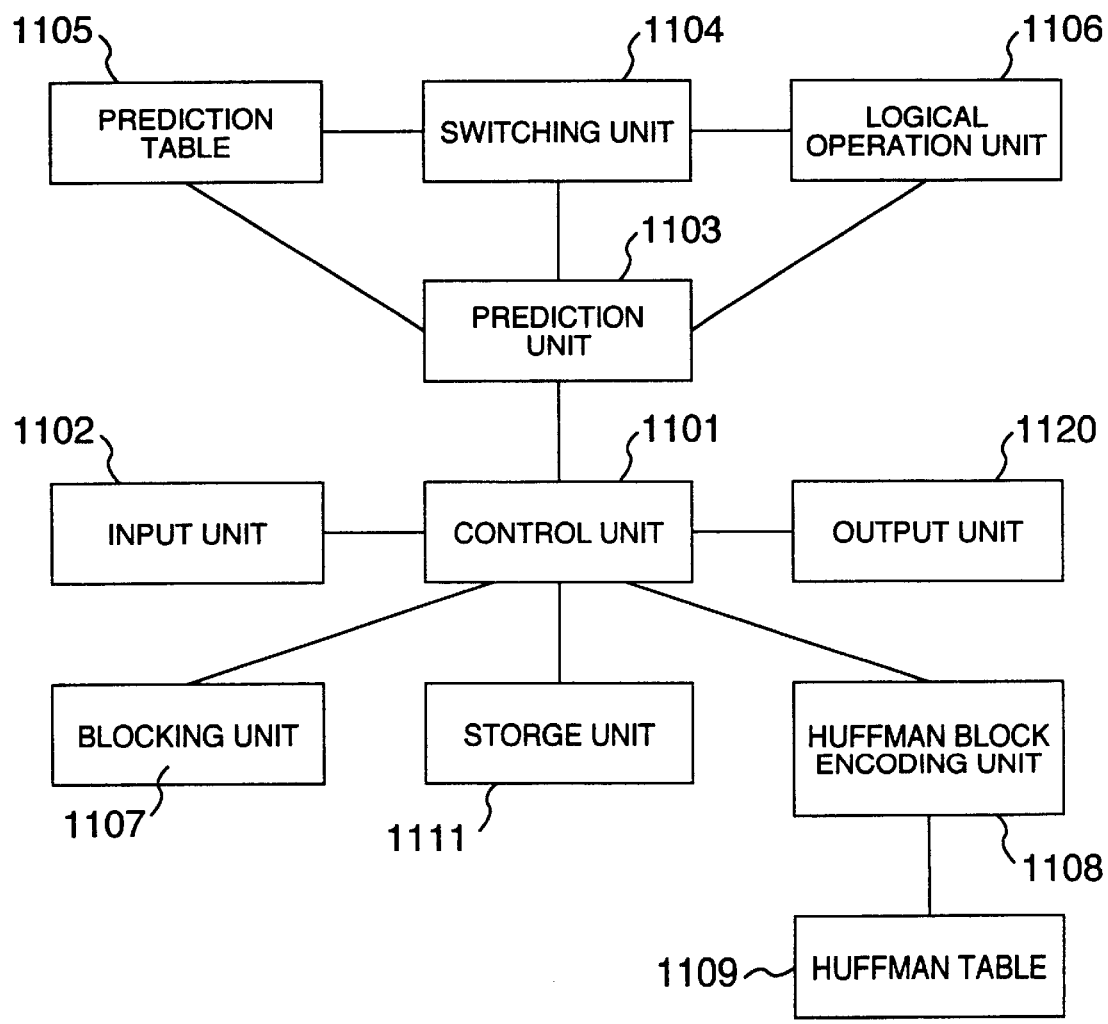
FIG. 22 is a block diagram illustrating the configuration of a binary image encoding apparatus according to a fifth embodiment of the present invention.
Figure 23:
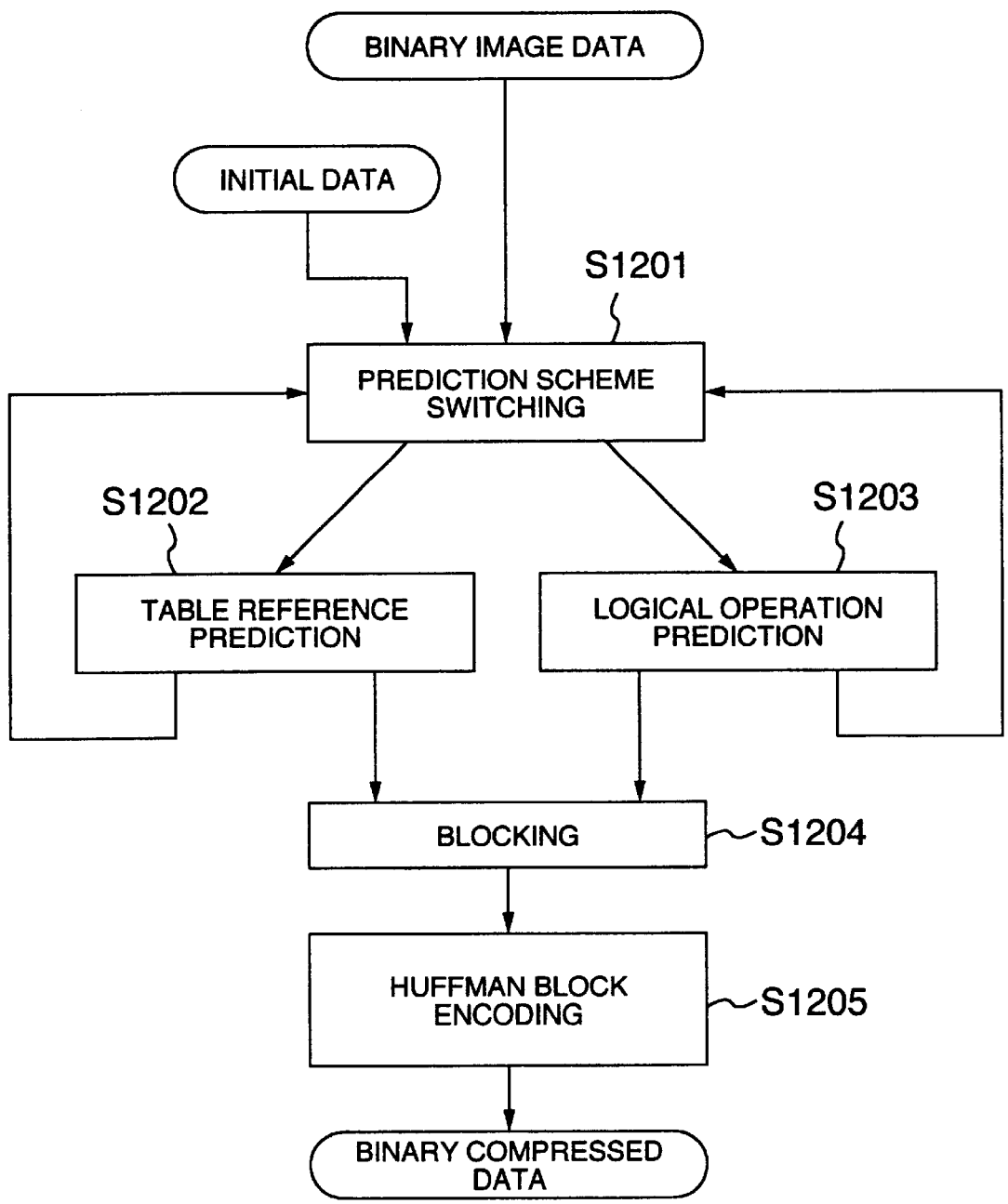
FIG. 23 is a flow chart illustrating the operation of the binary image encoding apparatus of FIG. 22.
Figure 24:
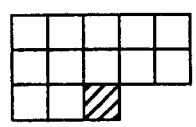
FIG. 24 is a diagram for explaining an example of the reference pixels for use in switching a prediction scheme to another in the binary image encoding apparatus of FIG. 22.
Figures 25, 26:
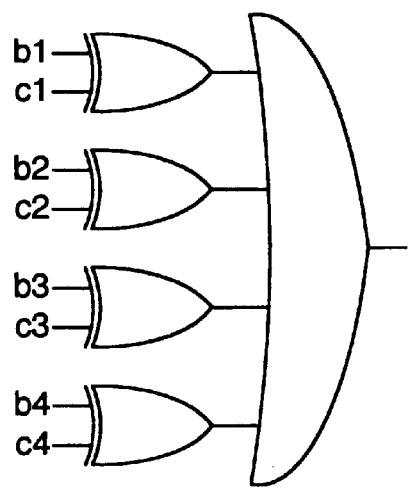
FIG. 25 is a diagram for explaining an example of the reference pixels for use in prediction through a logical operation in the binary image encoding apparatus of FIG. 22.
FIG. 26 is a diagram for explaining an example of the logical operation in the binary image encoding apparatus of FIG. 22.

FIG. 22 is a block diagram illustrating the configuration of a binary image encoding apparatus according to a fifth embodiment of the present invention. FIG. 23 is a flow chart illustrating the operation of the binary image encoding apparatus of FIG. 22. FIG. 24 is a diagram for explaining exemplary reference pixels for use in switching a prediction scheme to another in the binary image encoding apparatus of FIG. 22. FIG. 25 is a diagram for explaining exemplary reference pixels for use in the prediction through a logical operation in the binary image encoding apparatus of FIG. 22. FIG. 26 is a diagram for explaining an example of the logical operation expression in the binary image encoding apparatus of FIG. 22.

As illustrated in FIG. 22, the binary image encoding apparatus according to the fifth embodiment comprises: an input unit 1102 for receiving binary image data; a switching unit 1104 for switching whether the prediction is performed with reference to a prediction table 1105 or using a logical operation unit 1106; a prediction unit 1103 for predicting the binary image for the encoding-target pixel in accordance with the prediction form switched by the switching unit 1104, i.e., using the logical operation unit 1106 when the prediction through the logical operation is possible and otherwise using the prediction table 1105, to produce a data sequence indicative of the prediction hit or miss; a blocking unit 1107 for blocking the data sequence produced by the prediction unit 1103; a Huffman block encoding unit (entropy encoding) 1108 for applying the Huffman block encoding (entropy encoding) to the blocked data sequence using a Huffman table (table) 1109; an output unit 1110 for outputting Huffman-block encoded binary compressed data; a control unit 1101 for controlling the operation of the apparatus; and a storage unit 1111 for storing a control program executed by the control unit 1101.

Next, the flow of the processing in the binary image encoding apparatus configured as described above will be described with reference FIG. 23.

The control unit 1101 receives from the input unit 1102 the binary image data which is an input image, and transfers the binary image data to the prediction unit 1103. The switching unit 1104 switches the prediction scheme between the table reference prediction and the logical operation prediction using the already-encoded pixels around the encoding-target pixel (S1201). It should be noted that since there are no already-encoded pixels in an initial state, a substitute initial data sequence is applied to the switching unit 1104.

When the table reference prediction is performed, the prediction unit 1103 performs the prediction using the prediction table 1105 (S1202). On the other hand, when the logical operation prediction is performed, the prediction unit 1103 performs the prediction-using the logical operation unit 1106 (S1203). The output data of the prediction unit 1103 is the data sequence indicative of the prediction hit or miss. The data sequence indicative of the prediction hit or miss is transferred to the blocking unit 1107 by the control unit 1101.

The blocking unit 1107 converts the data sequence indicative of the prediction hit or miss to the blocked data which consists of M×N pixels (S1204).

Subsequently, the control unit 1101 transfers the blocked data to the Huffman block encoding unit 1108. The Huffman block encoding unit 1108 applies the Huffman block encoding to the blocked data using the Huffman table 1109 (S1205). Finally, the control unit 1101 outputs the compressed data from the output unit 1110.

In this configuration, the storage unit 1111 for storing the control program for controlling these operations may be provided in the control unit 1101 such that the operation of each module is controlled in accordance with the control program stored in the storage unit 1111.

Next, the switching unit 1104 and the logical operation unit 1106 will be described in a specific manner.

The switching unit 1104 switches the prediction scheme between the table reference prediction and the logical operation prediction with reference to the prediction error data for the surrounding pixels. For example, the switching unit 1104 switches the prediction scheme in accordance with the proportion of hits to misses in the prediction error data for 12 already-encoded pixels around the encoding-target pixel, for example, as shown in FIG. 24. When the number of the miss pixels is larger than a threshold value, the switching unit 1104 selects the table reference prediction as the prediction scheme for improving the accuracy of the prediction. On the other hand, when the number of the miss pixels is smaller than the threshold value, this means that dots are regularly arranged with high probability, so that the switching unit 1104 selects the logical operation prediction as the prediction scheme. It should be noted that the number of the pixels referenced for the prediction may be different between the table reference prediction and the logical operation prediction. Also, when the surrounding encoded pixels include the small number of the miss pixels, meaning that dots are regularly arranged with high probability, the increased number of the referenced pixels may be used for the logical operation prediction for improving the accuracy of the prediction. In this event, since the tables need to be created only for a region where the large number of the prediction miss pixels are encountered, the prediction can be accomplished with the smaller table area.

The logical operation unit 1106 logically predicts the encoding-target pixel utilizing the surrounding pixels.

FIG. 25 shows an example of the reference pixels for use in the logical operation. FIG. 26 illustrates an exemplary logical operation circuit using the reference pixels shown in FIG. 25.

In FIG. 26, the logical operation circuit uses the reference pixels b1, b2, b3, b4, c1, c2, c3 and c4 to take the logical exclusive OR of (b1, c1), (b2, c2), (b3, c3) and (b4, c4), respectively, and calculates the logical OR of the outputs of the respective logical exclusive OR gates. The predicted value for the encoding-target pixel x is chosen to be "b4" when the calculation result is "0", and the predicted value for the encoding-target pixel X is chose to be "a4" when the calculation result is "1". It should be noted that any prediction method other than the foregoing may also be used.

As described above, the binary image encoding apparatus according to the fifth embodiment deletes from the prediction table 1105 such patterns that need not be contained therein for determining the predicted values due to the partiality of pixel information, and performs the prediction through the logical operation. Thereby, it is possible to reduce the size of the prediction table 1105 and to accomplish the high speed binary image encoding at the higher compression ratio.

As appreciated from the foregoing, according to the third to fifth embodiments, since the binary image encoding apparatus predicts the binary image for the encoding-target pixel using the surrounding binary image data and the prediction error data for the already-encoded pixels, the binary image encoding can be accomplished at the higher compression ratio.

Also, according to the third to fifth embodiments, the binary image encoding apparatus predicts the binary image for encoding-target pixel using the smaller number of the surrounding pixels selected as the reference pixels for use in the prediction from the prediction error data for the already-encoded pixels. Thereby, it is possible to advantageously accomplish the high speed binary image encoding at the higher compression ratio.

Further, according to the third to fifth embodiments, the binary image encoding apparatus deletes from the prediction table such patterns that need not be contained therein for determining the predicted values due to the partiality of the surrounding pixel information, and performs the prediction through the logical operation. Thereby, it is possible to advantageously reduce the size of the prediction table and to accomplish the high speed binary image encoding at the higher compression ratio.

What is claimed is:

1. A binary image encoding method comprising:

a predicting step of predicting a binary image;

a blocking step of blocking a data sequence into blocks to produce blocked data, the data sequence indicating whether a prediction at the predicting stop is hit or miss;

a converting step of converting the blocked data to run data when the number of consecutive blocks exceeds a threshold value, all of the predictions of the blocked data for pixels within each of the consecutive blocks being hit, and the run data indicating the number of the consecutive blocks in each of which all of the predictions are hit; and an encoding step of encoding the run data in accordance with a Huffman block encoding scheme when the blocked data is converted to the run data at the converting step, and encoding the blocked data in accordance with the Huffman block encoding scheme when the blocked data is not converted to the run data.

2. A binary image encoding apparatus comprising:

a prediction unit for predicting a binary image;

a blocking unit for blocking a data sequence into blocks to produce blocked data, the data sequence indicating whether the predictions in the prediction unit are hit or miss;

a run data creation unit for converting the blocked data to run data when the number of consecutive blocks exceeds a threshold value, all of the predictions of the blocked data for pixels within each of the consecutive blocks being hit, and the run data indicating the number of the consecutive blocks in each of which all of the predictions are hit;

a Huffman block encoding unit for encoding the run data in accordance with a Huffman block encoding scheme when the blocked data is converted to the run data by the run data creation unit, and encoding the blocked data in accordance with the Huffman block encoding scheme when the blocked data is not converted to the run data by the run data creation unit; and a control unit for controlling the binary image encoding apparatus.

3. A recording medium having a program recorded thereon, the program causing a computer to execute the steps of:

predicting a binary image;

blocking a data sequence into blocks to produce blocked data, the data sequence indicating whether a prediction at the predicting step is hit or miss;

converting the blocked data to run data when the number of consecutive blocks exceeds a threshold value, all of the predictions of the blocked data for pixels within each of the consecutive blocks being hit, and the run data indicating the number of the consecutive blocks in each of which all of the predictions are hit; and encoding the run data in accordance with a Huffman block encoding scheme when the blocked data is converted to the run data at the converting step, and encoding the blocked data in accordance with the Huffman block encoding scheme when the blocked data is not converted to the run data.

* * * * *